(12) United States Patent
Yonemoto et al.

(10) Patent No.: US 7,697,559 B2
(45) Date of Patent: Apr. 13, 2010

(54) COMMUNICATION TERMINAL, SERVER, RELAY APPARATUS, BROADCAST COMMUNICATION SYSTEM, BROADCAST COMMUNICATION METHOD, AND PROGRAM

(75) Inventors: Yoshifumi Yonemoto, Yokohama (JP); Takeshi Yoshimura, Yokohama (JP); Minoru Etoh, Yokohama (JP); Takashi Suzuki, Suita (JP)

(73) Assignee: NTT DoCoMo, Inc., Tokyo (JP)

( * ) Notice: Subject to any disclaimer, the term of this patent is extended or adjusted under 35 U.S.C. 154(b) by 1403 days.

(21) Appl. No.: 10/354,019

(22) Filed: Jan. 30, 2003

(65) Prior Publication Data

US 2003/0162495 A1 Aug. 28, 2003

(30) Foreign Application Priority Data

| Jan. 30, 2002 | (JP) | ............................ P2002-022600 |
| Dec. 27, 2002 | (JP) | ............................ P2002-382333 |

(51) Int. Cl.
*H04J 3/26* (2006.01)
(52) U.S. Cl. ...................................... 370/432; 370/474
(58) Field of Classification Search ................. 370/312, 370/315, 320, 432, 474; 455/7, 550.1, 550
See application file for complete search history.

(56) References Cited

U.S. PATENT DOCUMENTS

| 5,894,480 | A * | 4/1999 | Hoffert et al. ............... 370/389 |
| 6,442,598 | B1 * | 8/2002 | Wright et al. ............... 709/217 |
| 6,741,576 | B1 * | 5/2004 | Alimi et al. ................. 370/329 |
| 7,058,728 | B1 * | 6/2006 | Eklund ........................ 709/247 |
| 7,103,667 | B1 * | 9/2006 | Bell et al. ................... 709/227 |
| 2002/0094027 | A1 * | 7/2002 | Sato et al. .............. 375/240.13 |
| 2002/0124270 | A1 * | 9/2002 | Mori et al. ................... 725/151 |
| 2003/0043847 | A1 * | 3/2003 | Haddad ....................... 370/473 |
| 2003/0051252 | A1 * | 3/2003 | Miyaoku et al. ............ 725/109 |
| 2003/0134651 | A1 * | 7/2003 | Hsu ............................ 455/509 |

(Continued)

FOREIGN PATENT DOCUMENTS

JP 11-220500 8/1999

(Continued)

OTHER PUBLICATIONS

M. Handley, et al., "Session Announcement Protocol", RFC2974. TXT, IETF Standard, Internet Engineering Task Force, http://www.sanface.com/txt2pdf.html, XP-015008757, Oct. 2000, pp. 1-19.

(Continued)

*Primary Examiner*—Kwang B Yao
*Assistant Examiner*—Tung Q Tran
(74) *Attorney, Agent, or Firm*—Oblon, Spivak, McClelland, Maier & Neustadt, L.L.P.

(57) ABSTRACT

An apparatus and associated methodology provided to enable broadcast media to be reproduced quickly while reducing an overhead accompanied with the broadcast media. A broadcast communication system transmits the broadcast media from a server to a communication terminal. The server transmits broadcast notification information (SAP message) designating at least one broadcast media, and transmits reproduction information indicating a reproduction method of the designated broadcast media prior to reproduction of the broadcast media by the communication terminal. The communication terminal reproduces the broadcast media designated by the broadcast notification information (SAP message) based on the reproduction information when receiving the broadcast notification information.

5 Claims, 35 Drawing Sheets

U.S. PATENT DOCUMENTS

| | | | |
|---|---|---|---|
| 2003/0147390 A1* | 8/2003 | Rizzo et al. | 370/390 |
| 2003/0172114 A1* | 9/2003 | Leung | 709/205 |
| 2003/0206723 A1* | 11/2003 | Ando et al. | 386/96 |
| 2004/0005887 A1* | 1/2004 | Bahrenburg et al. | 455/422.1 |
| 2004/0221143 A1* | 11/2004 | Wise et al. | 712/300 |
| 2004/0250289 A1* | 12/2004 | Hirai et al. | 725/115 |

FOREIGN PATENT DOCUMENTS

| | | |
|---|---|---|
| WO | WO 00/33534 | 6/2000 |
| WO | WO 00/36804 | 6/2000 |
| WO | WO 01/99348 A1 | 12/2001 |

OTHER PUBLICATIONS

M. Handley, et al., "SDP: Session Description Protocol", RFC2327. TXT, IETF Standard, Internet Engineering Task Force, http://www.sanface.com/txt2pdf.html, XP-015008111, Apr. 1998, pp. 1-43.

Takeshi Yoshimura, et al., "Mobile Broadcast Streaming Service and Protocols on Unidirectional Radio Channels", IEICE Transactions on Communications, XP-001209291, vol. E87-B, No. 9, Sep. 2004, pp. 2596-2604.

* cited by examiner

FIG. 4

```
v = 0
o = mhandley 2890844526 2890842807 IN IP4 126.16.64.4
s = SDP Seminar
i = A Seminar on the session description protocol
u = http://www.cs.ucl.ac.uk/staff/M.Handley/sdp.03.ps
c = IN IP4 224.2.17.12/127
t = 2873397496 2873404696
m = audio 3456 RTP/AVP 0
a = rtpmap:96L8/8000
m = video 2232 RTP/AVP 98
a = rtpmap:98 MP4V-ES/90000
a = fmtp:98 config = 001b3001b9001000120084f2522a1;smm_framesize = 352-288
b = AS:384.00
m = application 32416 udp dc
```

FIG. 8

```
<smil>
<head><layout>
<region id = "a" top = "5" left = "5" width = "180" height = "180" z-index = "1"/>
<region id = "b" top = "190" left = "5" width = "180" height = "20" z-index = "2"/>
<region id = "c" top = "190" left = "120" width = "30" height = "20" z-index = "3"/>
</layout></head><body>
<par>
<audio src = "":<port-a01>/"/>
<video src = "":<port-v01>/"region = "a"/>
<text src = "",~/module01"region = "b"/>
<text src = "",~/module02"region = "c"/>
</par>
</body></smil>
```

```
<html><body>
<MARQUEE direction = "left" behavior = "scroll">
IT IS CLEAR AND SUNNY TODAY . . .
</MARQUEE>
</body></html>
```

```
<html><body>
<a href = "http://foo.co.jp/kanagawa.html">WEEKLY WEATHER FORECAST OF KANAGAWA PREFECTURE</a>
</body></html>
```

FIG. 12

```
v = 0
o = mhandley 2890844526 2890842807 IN IP4 126.16.64.4
s = SDP Seminar
i = A Seminar on the session description protocol
u = http://www.cs.ucl.ac.uk/staff/M.Handley/sdp.03.ps
c = IN IP4 224.2.17.12/127
t = 2873397496 2873404696
require = mid:3; "module00" = "http://docomo.ne.jp/layout01.smil"
m = audio 3456 RTP/AVP 0
a = rtpmap:96L8/8000
a = mid:1
m = video 2232 RTP/AVP 98
a = rtpmap:98 MP4V-ES/90000
a = fmtp:98 config = 001b3001b9001000120084f2522a1;smm_framesize = 352-288
b = AS:384.00
a = mid:2
m = application 32416 udp dc
a = mid:3
```

FIG. 15

```
v = 0
o = mhandley 2890844526 2890842807 IN IP4 126.16.64.4
s = SDP Seminar
i = A Seminar on the session description protocol
u = http://www.cs.ucl.ac.uk/staff/M.Handley/sdp.03.ps
c = IN IP4 224.2.17.12/127
t = 2873397496 2873404696
layout = "http://docomo.ne.jp/layout01.smil";cid = docomo0123
m = audio 3456 RTP/AVP 0
a = rtpmap:96L8/8000
a = mid:1
m = video 2232 RTP/AVP 98
a = rtpmap:98 MP4V-ES/90000
a = fmtp:98 config = 001b3001b9001000120084f2522a1;smm_framesize = 352-288
b = AS:384.00
a = mid:2
m = application 32416 udp dc
a = mid:3
```

FIG. 18

```
<smil>
<head><layout>
<region id = "a" top = "5" left = "5" width = "180" height = "180" z-index = "1"/>
<region id = "b" top = "190" left = "5" width = "180" height = "20" z-index = "2"/>
<region id = "c" top = "190" left = "120" width = "30" height = "20" z-index = "3"/>
</layout></head><body>
<par>
<audio src = ":<port-a01>/"/>                                    AUDIO INFORMATION
<video src = ":<port-v01>/"region = "a" id = "v1"/>              VIDEO INFORMATION
<text src = "~/module01"region = "b"/>                           FIRST TEXT INFORMATION
<text src = "~/module02"region = "c" require = "id:v1" sync = "ntptime"/>   SECOND TEXT INFORMATION
</par>
</body></smil>
```

IT IS ESSENTIAL TO REPRODUCE VIDEO INFORMATION INDICATED BY "v1" IN ORDER TO DISPLAY SECOND TEXT INFORMATION INSTRUCT SYNCHRONIZATION BY "sync = ntptime" AT TIME OF ntptime: INFORMATION FOR DETERMINING WHETHER OR NOT TO BE SYNCHRONIZED WITH TRANSMISSION TIME OF REAL-TIME STREAMING

FIG. 27

CHANNEL FOR SAP MESSAGE

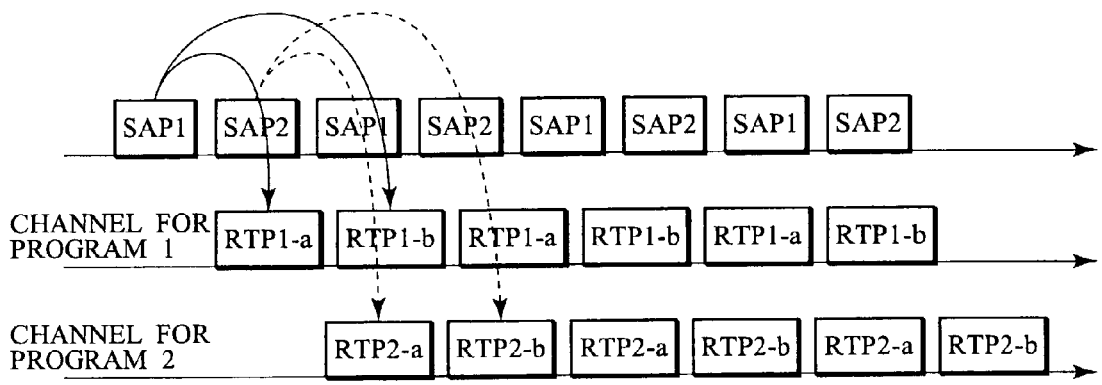

FIG. 28

SDP INFORMATION IN SAP MESSAGE v = 0
o = mhandley 2890844526 2890842807 IN IP4 126.16.64.4
s = SDP Seminar
i = A Seminar on the session description protocol
u = http://www.cs.ucl.ac.uk/staff/M.Handley/sdp.03.ps
e = mjh@isi.edu (Mark Handley)
c = Channel ABCDE IN IP4 224.2.17.12/127
t = 2873397496 2873404696
a = recvonly
m = audio 3456 RTP/AVP 0
m = video 2232 RTP/AVP 31
m = whiteboard 32416 UDP WB
a = orient:portrait CHANNEL INFORMATION OF BROADCAST MEDIA (CHANNELIZATION CODE) AND MULTICAST ADDRESS ARE NOTIFIED BY SDP INFORMATION

FIG. 33

```
<smil>
<head>
<layout>
<region id = "a" top = "5" left = "5" width = "180" height = "180" z-index = "1"/>
<region id = "b" top = "190" left = "5" width = "180" height = "20" z-index = "2"/>
<region id = "c" top = "190" left = "120" width = "30" height = "20" z-index = "3"/>
</layout></head><body>
<par>
<audio src = "LCN2"/>
<video src = "LCN3"region = "a"/>
<text src = "~/module01"region = "b"/>
<text src = "~/module02"region = "c"/>
</par>
</body></smil>
```

FIG. 34

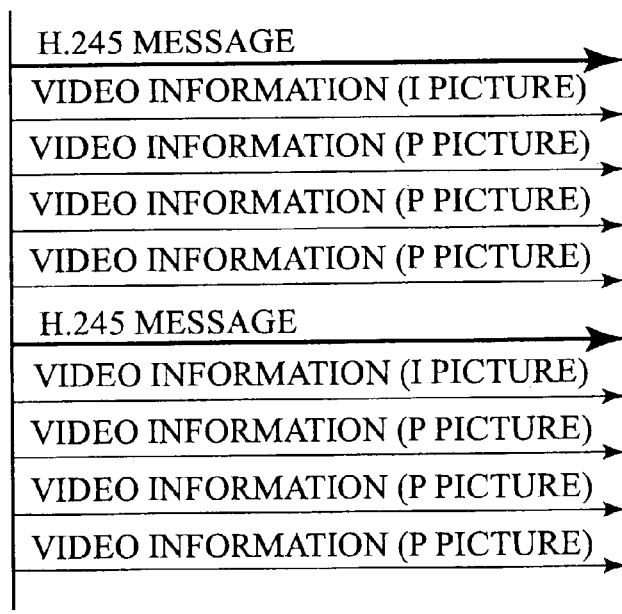

FIG. 41

```
v=0
o=DoCoMo 2890844526 2890842807 IN IP4 126.16.64.4
s=SDP Seminar
i=A Seminar on the session description protocol
u=http://www.cs.ucl.ac.uk/staff/M.Handley/sdp.03.ps
c=IN IP4 224.2.17.12/127
t=2873397496 2873404696 m=audio 3456 RTP/AVPO
a=rtpmap:96 L8/8000
a=mid:1 m=video 2232 RTP/A VP 98
a=rtpmap:98 MP4V-ES/90000
a=fmtp:98 config=001b3001b900100012084f2522a1;smm_framesize=352-288
b=AS:384.00
a=mid:2 m=application 1234 RTP/A VP 100
a=rtpmap:100X-dc/8000                    } SMIL
a=fmtp:100 content-type=application/smil
a=mid:3 m=applicatin 1234 RTP/A VP 101
a=rtpmap:101X-dc/8000                    } STILL IMAGE
a=fmtp:101 content-type=image/jpeg         INFORMATION
a=mid:4 m=applicatin 1234 RTP/A VP 102
a=rtpmap:102X-dc/8000                    } TEXT INFORMATION
a=fmtp:102 content-type=text/html
a=mid:5
```

FIG. 42

```
<!DOCTYPE smil PUBLIC"-//W3C//DTD SMIL 2.0//EN"
"http://www.w3.org/2001/SMIL20/SMIL20.dtd">
<smil xmlns="http://www.w3.org/2001/SMIL20/Language">
  <head>
    <layout>
      <region id="a"top="5" left="5" width="180" height="180"/>
      <region id="b"top="190" left="5" width="180" height="20"/>
      <region id="c"top="10" left="120" width="50" height="20"/>
    </layout>
  </head>
  <body>
    <par>
      <audio src=" mid=1" />
      <video src=" mid=2" region="a"/>
      <img src=" mid=4" region="b"/>
      <text src=" mid=5" region="c"/>
    </par>
  </body>
</smil>
```

FIG. 43

```
...
<a href="bc-link://DoCoMo;890844526/">
...
```

```
v = 0
o = mhandley 2890844526 2890842807 IN IP4 126.16.64.4
s = SDP Seminar
i = A Seminar on the session description protocol
u = http://www.cs.ucl.ac.uk/staff/M.Handley/sdp.03.ps
e = mjh@isi.edu (Mark Handley)
c = IN IP4 224.2.17.12/127   ← NOTIFY MULTICAST
                                ADDRESS OF
t = 2873397496 2873404696     BROADCAST MEDIA a = recvonly m = audio 3456 RTP/AVP 0
m = video 2232 RTP/AVP 31
m = whiteboard 32416 UDP WB
a = orient:portrait
```

COMMUNICATION TERMINAL, SERVER, RELAY APPARATUS, BROADCAST COMMUNICATION SYSTEM, BROADCAST COMMUNICATION METHOD, AND PROGRAM

CROSS REFERENCE TO RELATED APPLICATIONS

This application is based upon and claims the benefit of priority from the prior Japanese Patent Application No. P2002-22600, filed on Jan. 30, 2002; and the prior Japanese Patent Application No. P2002-382333, filed on Dec. 27, 2002 the entire contents of which are incorporated herein by reference.

BACKGROUND OF THE INVENTION

1. Field of the Invention

The present invention relates to a broadcast communication system and method for broadcasting broadcast media such as video information, audio information and the like, and to a communication terminal, a server, a relay apparatus, and a program, which are suitably used for the system and the method. Hereinafter, the word "broadcast" includes the meaning of "multicast".

2. Description of the Related Art

In recent years, the digital satellite broadcast communication system has become widespread. In the digital satellite broadcast communication system, multi-channelization has developed by utilizing a communication band with a large capacity, and a large number of channels dedicated to sports, movie, music, news and the like have been prepared. In these dedicated channels, program contents in accordance with plans and contents of the respective fields have been broadcasted. Then, broadcast media enabling the reproduction (playback) of the program contents has been broadcasted by use of the digital satellite broadcast communication system.

As a broadcast communication system for broadcasting such broadcast media as video information, music information and the like, Japanese Patent Laid-Open Publication 2000-358062 discloses "Digital data transmitting/receiving system and method", in which a variety of data such as broadcast media are transmitted by use of a data transmission format in conformity with the MPEG-2 system.

Moreover, as a broadcast communication system for repeatedly transmitting the variety of data such as broadcast media, Japanese Patent Laid-Open Publication 2001-53696 discloses a system for broadcasting a variety of data such as broadcast media by use of a "DSM-CC (Digital Storage Media Command and Control) data carousel system", prescribed in the ISO/IEC13818-6. In other words, this Publication discloses "Section sending apparatus and section sending method in digital broadcast", in which a variety of data such as broadcast media are repeatedly transmitted in a format which conforms to a section format prescribed in the ISO/IEC13818-1.

Meanwhile, as a broadcast communication system for the Internet, a broadcast communication system has been conceived for broadcasting broadcast media such as audio information, video information and the like, in which "information necessary to reproduce broadcast media (IP address information of a source and a destination, and the like)" is notified by use of a "SAP (Session Announcement Protocol) message" as broadcast notification information.

The SAP message is transmitted through a predetermined "IP address" and "port number". Moreover, the SAP message is uniquely identified by "IP address information of a source (originating source) of the SAP message" and a "message ID uniquely specifying the SAP message transmitted by the source (msg id hash), which are included in the SAP message".

In the broadcast communication system using the SAP message over the Internet, in general, a "multicast address (IP address information of a destination)" to which broadcast media is transmitted is designated to a "c field" in "SDP (Session Description Protocol) information" in the SAP message. A receiver can know the "multicast address (IP address information of the destination)" to which the broadcast media is transmitted by the "c field", and thus can see and hear the broadcast media.

FIG. 45 illustrates an example of transmitting two broadcast media in a conventional broadcast communication system.

Specifically, FIG. 45 is an example of transmitting, on one channel, two "SAP messages (SAP1, SAP2)" and "RTP (Real-time Transport Protocol: RFC 1889) packets (RTP1-a and RTP1-b, RTP2-a and RTP2-b)" which correspond to the respective SAP messages (SAP1, SAP2).

FIG. 46 is a description example of the "SDP information" of the SAP message. FIG. 46 shows a "multicast address (IP address information of a destination)" of broadcast media in a portion of "c=IN IP 4 224.2.17.12/127". Hence, a receiving terminal having received this SAP message can determine that the broadcast media is being broadcasted by the multicast address.

Moreover, in a packet-based communication system, a packet including audio and video information is transmitted as a RTP packet. A "RTP/UDP/IP header" as a header will be added to the RTP packet, the overhead thereof being extremely large.

As a method for reducing (compressing) the overhead of the RTP/UDP/IP header, "CRTP" prescribed in RFC2508 of IETF and "ROHC" prescribed in RFC3095 is known.

In any of the header compression methods, a "header compression refresh packet" for initializing a header compression state is first transmitted, and then a "header compression packet" in which the header is compressed is transmitted. In the "CRTP", a "FULL_HEADER" corresponds to the header compression refresh packet, and in the "ROHC", an "IR header" corresponds thereto.

In general, the digital satellite broadcast communication system having a communication band with a large capacity, and the broadcast communication system for the Internet are flexible, regarding the overhead in the repeated transmission of the broadcast media.

However, in a broadcast communication system including, as receiving terminals, mobile communication terminals that can only utilize a communication band with a relatively small capacity (low bit rate), there is an inherent problem in that the pressure for a transmission capacity of audio information, video information and the like is more significant by the above-described overhead.

Moreover, when the header compression method described above is simply applied to a packet-based broadcast communication system in order to reduce the above-described overhead, a receiving terminal that starts to see and hear the broadcast of the broadcast media from a halfway thereof has been unable to recover a header compression packet because the header compression state thereof is unclear even if the receiving terminal receives the header compression packet.

Moreover, the conventional broadcast communication system using the SAP message over the Internet has only one "physical channel" for use in transmitting the broadcast media, thus can see and hear the broadcast media by the designation of the IP address described in the "c field" of the "SDP information" in the SAP message. However, in the broadcast communication system using the mobile communication terminals, there has been a problem specifying to which wireless channel the broadcast media is broadcasted by only the designation of the IP address, because a plurality of broadcast media are conceived to be broadcasted by use of a plurality of wireless channels (physical channels).

Specifically, in the broadcast communication system using mobile communication terminals, there arises a subject concerning how the "physical channel" and a "logical address (IP address)", which are for use in broadcasting the broadcast media, are to be associated with each other.

Furthermore, unlike a communication system for receiving and reproducing multimedia information (broadcast media) by an indication from the receiving terminal, in the reception and reproduction of the multimedia information (broadcast media) in the broadcast communication system, there is an inherent problem in that a broadcast media supplier (source) cannot know at which timing the receiver starts to receive the broadcast media, and sometimes cannot make the receiver reproduce (playback) the broadcast media reliably.

BRIEF SUMMARY OF THE INVENTION

The present invention was made in consideration of the above-described problems. An object of the present invention is to make it possible to reproduce broadcast media quickly while reducing an overhead accompanied therewith.

Another object of the present invention is to enable even a receiving terminal that starts to see and hear a broadcast of broadcast media from a halfway thereof to reproduce the broadcast media immediately by transmitting the broadcast media by means of a header compression refresh packet, the broadcast media being transmitted immediately after transmitting broadcast notification information (SAP message or H.245 message).

In such a manner, even a receiving terminal that receives the broadcast notification information and starts to see and hear the broadcast of the broadcast media from the halfway thereof is able to reproduce broadcast media transmitted by the header compression packet after receiving the broadcast media transmitted by the header compression refresh packet. Moreover, it is made possible to realize a quick reproduction and a reduction of the transmission overhead.

Another object of the present invention is to associate a "physical channel" and a "logical address (IP address)" with each other, which are for use in broadcasting broadcast media, and to notify the physical channel and the logical address to a receiving terminal.

Another object of the present invention is to make it possible to indicate a reproduction method intended by a broadcast media supplier to a receiving terminal and to enable the receiving terminal to reproduce the broadcast media in accordance with the indication.

The first feature of the present invention is a communication terminal for reproducing received broadcast media, summarized in that the communication terminal acquires reproduction information indicating a reproduction method for the broadcast media prior to reproducing the broadcast media, and when receiving broadcast notification information designating at least one of the broadcast media, it reproduces the designated broadcast media based on the reproduction information.

In the first feature of the present invention, preferably, prior to reproducing the broadcast media, the communication terminal acquires reference information associated with the reproduction information, and acquires the reproduction information by use of the reference information.

Moreover, in the first feature of the present invention, preferably, the reproduction information includes layout information for use when reproducing the broadcast media.

Moreover, in the first feature of the present invention, preferably, the reproduction information includes timing information for use when reproducing the broadcast media.

Moreover, in the first feature of the present invention, preferably, when receiving essential processing information indicating essential processing which is to be performed essentially prior to reproducing the broadcast media, the communication terminal reproduces the broadcast media after performing the essential processing.

Moreover, in the first feature of the present invention, preferably, the essential processing information is included in the broadcast notification information.

Moreover, in the first feature of the present invention, preferably, the essential processing information indicates processing contents to be performed simultaneously with the reproduction of the broadcast media, and the essential processing is performed by the communication terminal simultaneously with the reproduction of the broadcast media.

Moreover, in the first feature of the present invention, preferably, when the broadcast media received through a wireless channel is reproduced, and when the broadcast notification information includes correspondence information between identification information of a physical channel and identification information of a logical channel to which the broadcast media is transmitted, the communication terminal reproduces the broadcast media based on the correspondence information.

Moreover, in the first feature of the present invention, preferably, the logical channel identification information is an IP address. Moreover, in the first feature of the present invention, preferably, the physical channel identification information is a channelization code of a CDMA communication system. Moreover, in the first feature of the present invention, preferably, the physical channel identification information is a frequency value.

Moreover, in the first feature of the present invention, preferably, the broadcast notification information includes broadcast media identification information identifying at least one of the broadcast media, and the broadcast media identification information is used as the reproduction information.

The second feature of the present invention is a server for delivering broadcast media to a communication terminal, summarized in that the server transmits thereto broadcast notification information designating at least one of the broadcast media, and further transmits thereto reproduction information indicating a reproduction method for the broadcast media designated by the broadcast notification information prior to the reproduction of the broadcast media by the communication terminal.

In the second feature of the present invention, preferably, the server transmits reference information associated with the reproduction information prior to the reproduction of the broadcast media by the communication terminal.

In the second feature of the present invention, preferably, the server transmits the broadcast notification information periodically and repeatedly, and transmits the reproduction information by carousel data immediately after transmitting the broadcast notification information.

Moreover, in the second feature of the present invention, preferably, the broadcast notification information indicates that the reproduction information is transmitted by the carousel data.

Moreover, in the second feature of the present invention, preferably, the reproduction information includes layout information for use when reproducing the broadcast media.

Moreover, in the second feature of the present invention, preferably, the reproduction information includes timing information for use when reproducing the broadcast media.

Moreover, in the second feature of the present invention, preferably, the server transmits essential processing information indicating essential processing which is to be performed essentially by the communication terminal prior to the reproduction of the broadcast media by the communication terminal.

Moreover, in the second feature of the present invention, preferably, the essential processing information is included in the broadcast notification information.

Moreover, in the second feature of the present invention, preferably, the essential processing information indicates processing contents to be performed simultaneously with the reproduction of the broadcast media by the communication terminal.

Moreover, in the second feature of the present invention, preferably, when the server delivers the broadcast media to the communication terminal through a wireless channel, the server transmits correspondence information between identification information of a physical channel and identification information of a logical channel to which the broadcast media is transmitted, by the broadcast notification information.

Moreover, in the second feature of the present invention, preferably, the logical channel identification information is an IP address. Moreover, in the second feature of the present invention, preferably, the physical channel identification information is a channelization code of a CDMA communication system. Moreover, in the second feature of the present invention, preferably, the physical channel identification information is a frequency value.

Moreover, in the second feature of the present invention, preferably, the server first transmits the broadcast media to the communication terminal in a format reproducible without referring to another broadcast media after transmitting the broadcast notification information thereto.

Moreover, in the second feature of the present invention, preferably, the server first transmits the broadcast media to the communication terminal in a format reproducible without performing a predictive coding (by a header compression refresh packet, an I picture frame and the like) after transmitting the broadcast notification information thereto.

Moreover, in the second feature of the present invention, preferably, the server transmits the broadcast media to be first transmitted after transmitting the broadcast notification information and identification information indicating an effect thereof in association with each other.

Moreover, in the second feature of the present invention, preferably, the server transmits the broadcast notification information including broadcast media identification information identifying at least one of the broadcast media and transmits the media identification information and the reproduction information in association with each other.

The third feature of the present invention is a relay apparatus for relaying broadcast media transmitted from a server to a communication terminal, summarized in that the relay apparatus relays at least one broadcast media first transmitted after broadcast notification information is transmitted by the server to the communication terminal in a format reproducible without referring to another broadcast media.

The fourth feature of the present invention is a relay apparatus for relaying broadcast media transmitted from a server to a communication terminal, summarized in that the relay apparatus relays the broadcast media to the communication terminal in a format reproducible without referring to another broadcast media when identification information indicating an effect that the broadcast media is one first transmitted after transmitting broadcast notification information is associated with the broadcast media received from the server.

The fifth feature of the present invention is a relay apparatus for relaying broadcast media transmitted from a server to a communication terminal, summarized in that the relay apparatus relays the broadcast media to the communication terminal in a format reproducible without performing a predictive coding when identification information indicating an effect that the broadcast media is one first transmitted after transmitting broadcast notification information is associated with the broadcast media received from the server.

The sixth feature of the present invention is a broadcast communication system for transmitting broadcast media from a server to a communication terminal, summarized in that the server transmits broadcast notification information designating at least one broadcast media, and transmits reproduction information indicating a reproduction method for the broadcast media designated by the broadcast notification information prior to a reproduction of the broadcast media by the communication terminal, and the communication terminal reproduces the broadcast media designated by the broadcast notification information based on the reproduction information when receiving the broadcast notification information.

The seventh feature of the present invention is a broadcast communication system in which a relay apparatus relays broadcast media from a server to a communication terminal, summarized in that the relay apparatus relays at least one broadcast media, which is first transmitted after broadcast notification information is transmitted by the server, in a format reproducible without referring to another broadcast media.

The eighth feature of the present invention is a broadcast communication system in which a relay apparatus relays broadcast media from a server to a communication terminal, summarized in that the server transmits identification information indicating whether or not the broadcast media is one first transmitted after transmitting broadcast notification information in association with the broadcast media, and the relay apparatus relays the broadcast media to the communication terminal in a format reproducible without referring to another broadcast media when receiving the broadcast media associated with the identification information.

The ninth feature of the present invention is a broadcast communication system in which a relay apparatus relays broadcast media from a server to a communication terminal, summarized in that the server transmits identification information indicating whether or not the broadcast media is one first transmitted after transmitting broadcast notification information in association with the broadcast media, and the relay apparatus relays the broadcast media to the communication terminal in a format reproducible without performing a predictive coding when receiving the broadcast media associated with the identification information.

The tenth feature of the present invention is a broadcast communication method for transmitting broadcast media from a server to a communication terminal, summarized by including transmitting broadcast notification information designating at least one broadcast media by the server, transmitting reproduction information indicating a reproduction method for the broadcast media designated by the broadcast notification information prior to a reproduction of the broadcast media by the communication terminal, and reproducing, by the communication terminal, the broadcast media designated by the broadcast notification information based on the reproduction information when receiving the broadcast notification information.

The eleventh feature of the present invention is a broadcast communication method in which a relay apparatus relays broadcast media from a server to a communication terminal, summarized in that, by the relay apparatus, at least one broadcast media first transmitted after broadcast notification information is transmitted by the server is relayed to the communication terminal in a format reproducible without referring to another broadcast media.

The twelfth feature of the present invention is a broadcast communication method in which a relay apparatus relays broadcast media from a server to a communication terminal, summarized in that, by the server, identification information indicating whether or not the broadcast media is one first transmitted after transmitting broadcast notification information is transmitted in association with the broadcast media, and, by the relay apparatus, the broadcast media associated with the identification information is relayed to the communication terminal in a format reproducible without referring to another broadcast media when receiving the broadcast media.

The thirteenth feature of the present invention is a broadcast communication method in which a relay apparatus relays broadcast media from a server to a communication terminal, summarized in that, by the server, identification information indicating whether or not the broadcast media is one first transmitted after transmitting broadcast notification information is transmitted in association with the broadcast media, and, by the relay apparatus, the broadcast media associated with the identification information is relayed to the communication terminal in a format reproducible without performing a predictive coding when receiving the broadcast media.

The fourteenth feature of the present invention is summarized to be a program product for reproducing received broadcast media in a communication terminal. With the program product, the communication terminal executes the steps of acquiring reproduction information indicating a reproduction method for the broadcast media prior to a reproduction of the broadcast media, and when receiving broadcast notification information designating at least one of the broadcast media, reproducing the designated broadcast media based on the reproduction information.

The fifteenth feature of the present invention is summarized to be a program product for delivering broadcast media to a communication terminal in a server. With the program product, the server executes the steps of transmitting broadcast notification information designating at least one broadcast media, and transmitting reproduction information indicating a reproduction method for the broadcast media designated by the broadcast notification information prior to a reproduction of the broadcast media by the communication terminal.

BRIEF DESCRIPTION OF THE SEVERAL VIEWS OF THE DRAWINGS

FIG. 4 is a diagram showing SDP information in the SAP message for use in the broadcast communication system according to the one embodiment of the present invention.

FIG. 8 is a diagram showing SMIL for use in the broadcast communication system according to the one embodiment of the present invention.

FIG. 12 is a diagram showing SDP information in a SAP message for use in a broadcast communication system according to one embodiment of the present invention.

FIG. 15 is a diagram showing SDP information in a SAP message for use in a broadcast communication system according to one embodiment of the present invention.

FIG. 18 is a diagram showing SMIL for use in a broadcast communication system according to one embodiment of the present invention.

FIG. 27 is a diagram illustrating a state of transmitting a plurality of broadcast media in a broadcast communication system according to one embodiment of the present invention.

FIG. 28 is a diagram showing SDP information in a SAP message for use in the broadcast communication system according to the one embodiment of the present invention.

FIG. 33 is a diagram showing SMIL for use in the broadcast communication system according to the one embodiment of the present invention.

FIG. 34 is a sequence diagram of a broadcast communication system according to one embodiment of the present invention.

FIG. 41 is a diagram showing SDP information in a SAP message for use in a broadcast communication system according to one embodiment of the present invention.

FIG. 42 is a diagram showing SMIL for use in the broadcast communication system according to the one embodiment of the present invention.

FIG. 43 is a diagram showing a description example of text information (HTML) for use in the broadcast communication system according to the one embodiment of the present invention.

DETAILED DESCRIPTION OF THE INVENTION

Figure 1:
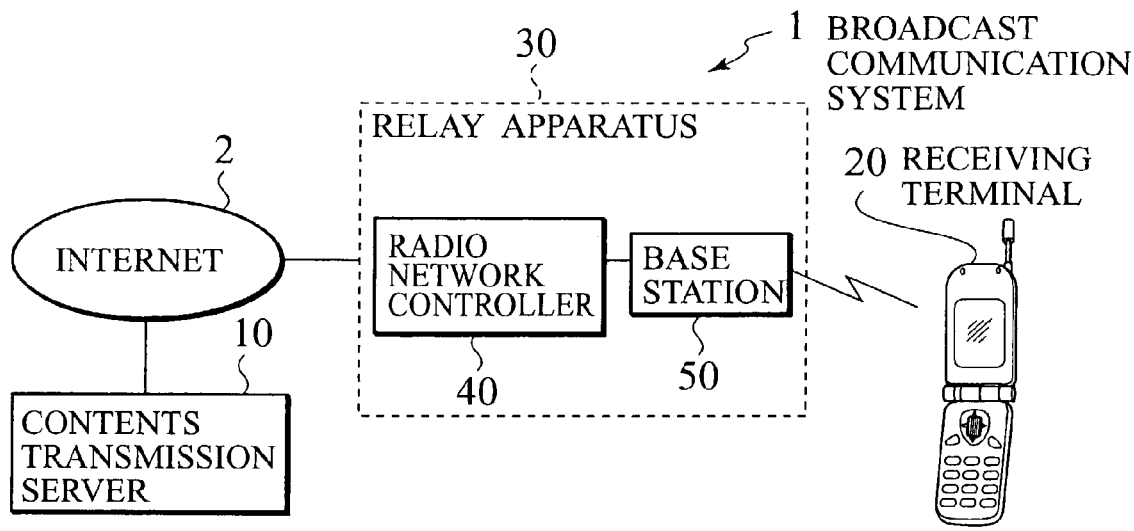
FIG. 1 is a schematic constitutional view of a broadcast communication system according to one embodiment of the present invention.

The embodiments of the present invention will be described below in detail while referring to FIGS. 1 to 44. FIG. 1 is a schematic constitutional view of a broadcast communication system in the embodiment of the present invention.

As shown in FIG. 1, the broadcast communication system 1 according to these embodiments includes the contents transmission server 10 delivering (transmitting) broadcast media, the receiving terminal 20 receiving and reproducing the delivered (transmitted) broadcast media, and the relay apparatus 30 composed of the radio network controller 40 and the base station 50.

In these embodiments, the term "broadcast media" will indicate, for example, audio information (AMR) and video information (MPEG-4), which are transmitted in a streaming format using the RTP packet, the I picture frame, the P picture frame and the like.

Although the case of using a mobile communication terminal as the receiving terminal 20 will be described below, the present invention can be applied to cases of using a terminal other than a mobile communication terminal.

The contents transmission server 10 is a server for delivering broadcast media to the receiving terminal 20 in a streaming format over the Internet 2, the relay apparatus 30 and a wireless channel. The receiving terminal 20 is a mobile communication terminal for reproducing the broadcast media received through the wireless channel. The relay apparatus 30 performs protocol/format conversion meeting the physical conditions of transmission lines according to needs.

First Embodiment

The first embodiment of the present invention will be described with reference to FIGS. 1 to 11. This embodiment will describe the broadcast communication system 1 for transmitting broadcast media including audio information, video information and the like in the format of the "RTP/UDP/IP" packet (broadcast media packet) which is an Internet protocol.

In this embodiment, the receiving terminal 20 acquires reproduction information indicating a reproduction method for broadcast media such as audio information, video information and the like prior to reproducing the broadcast media, and reproduces the broadcast media based on the reproduction information when receiving the broadcast notification information (SAP message). Here, the broadcast notification information (SAP message) designates at least one broadcast media.

Prior to the reproduction of the broadcast media by the receiving terminal 20, the contents transmission server 10 transmits reproduction information indicating a reproduction method for the broadcast media designated by the broadcast notification information (SAP message).

Before transmitting the broadcast media (RTP packet including AMR and RTP packet including MPEG-4) designated by the broadcast notification information (SAP message), the contents transmission server 10 transmits the reproduction information indicating the reproduction method for the broadcast media.

For example, the contents transmission server 10 can transmit the broadcast notification information (SAP message) periodically and repeatedly, and can transmit the reproduction information by carousel data immediately after transmitting the broadcast notification information (SAP message). Here, the carousel data means data transmitted by a system for transmitting the same data repeatedly (data carousel system).

Here, the reproduction information is included in "SDP information (refer to FIG. 4)" described in the "payload" of the SAP message, "SMIL (Synchronized Multimedia Integration Language) (refer to FIG. 8) transmitted by the data carousel system and the like.

Moreover, the reproduction information can include "layout information" for use when reproducing the broadcast media and "timing information" for use when reproducing the broadcast media.

Figure 2:
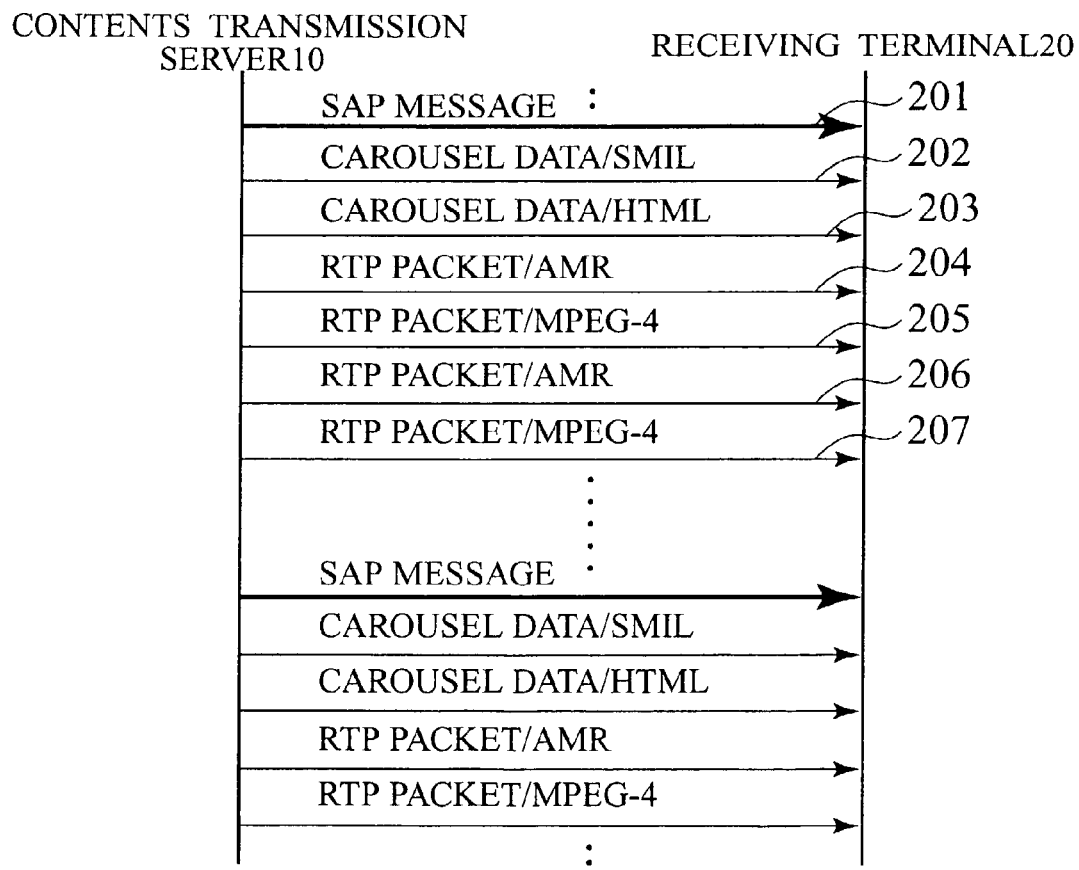
FIG. 2 is a sequence diagram of the broadcast communication system according to the one embodiment of the present invention.

FIG. 2 is a sequence diagram between the contents transmission server 10 and the receiving terminal 20 in the broadcast communication system 1 in this embodiment.

As shown in FIG. 2, the contents transmission server 10 transmits the "SAP message" which is the broadcast notification information, to the receiving terminal 20 in Step 201. The contents of the SAP message will be described later in detail with reference to FIGS. 3 and 4. Here, an "IP address" and a "port number", to which the SAP message is notified, are assumed to be already known to the receiving terminal 20.

In Step 202, the contents transmission server 10 transmits carousel data including the "SMIL" to the receiving terminal 20. In Step 203, the contents transmission server 10 transmits carousel data including text information and anchor information in the HTML format to the receiving terminal 20.

Figure 35:
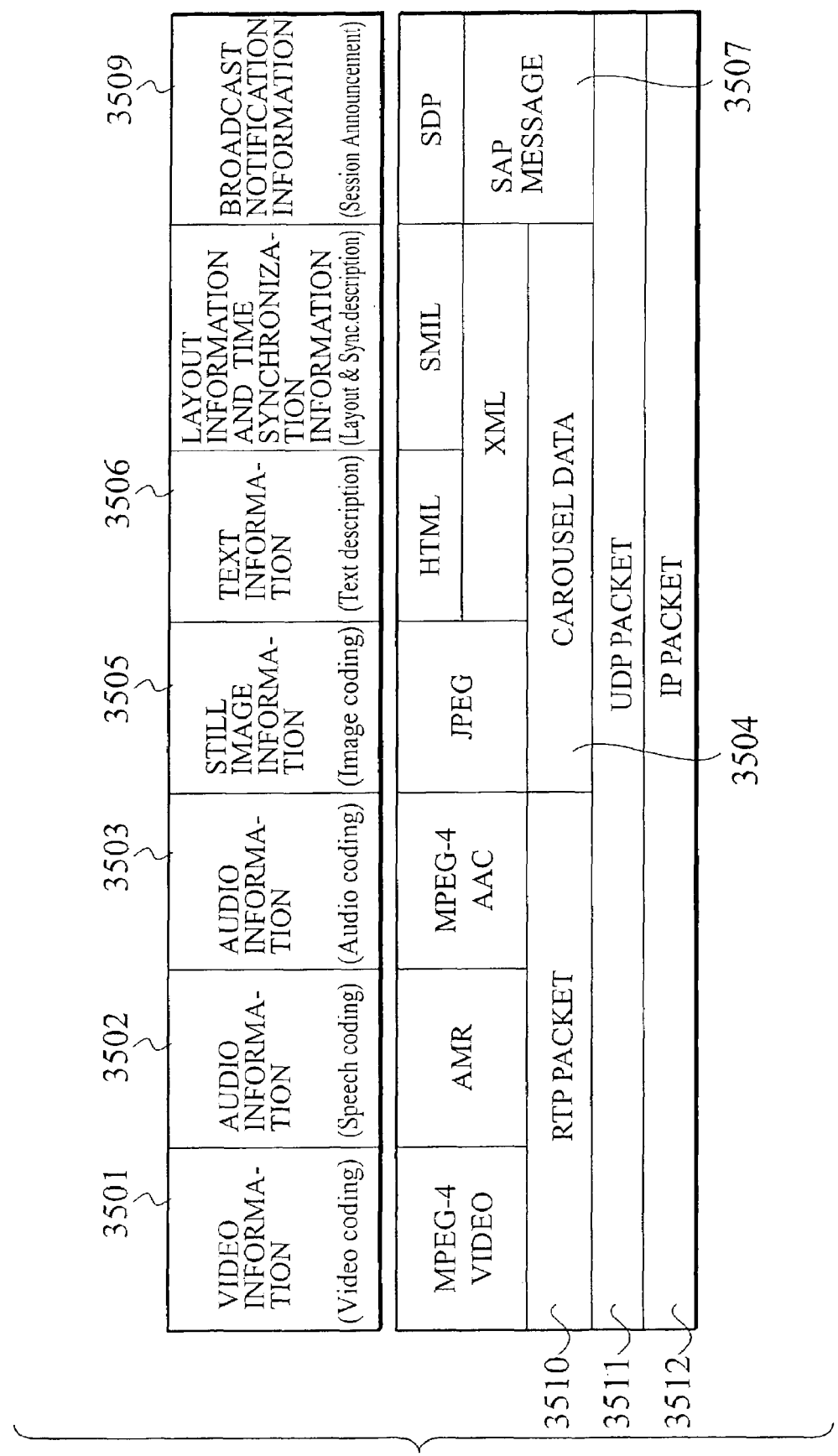
FIG. 35 is a diagram illustrating a protocol stack for use in a broadcast communication system according to one embodiment of the present invention.

For example, still-image information in the JPEG format and structuralized data in the XML format are transmitted by the data carousel system for sending data repeatedly on the UDP (refer to FIG. 35). The data carousel system will be described later in detail with reference to FIGS. 5 to 7.

In Steps 204 to 207, the contents transmission server 10 transmits a RTP packet (broadcast media packet) including audio information (AMR) and video information (MPEG-4) to the receiving terminal 20.

Here, the SAP message and the carousel data are transmitted by the UDP/IP packet, and the audio information and the video information are transmitted by the RTP packet on the UDP/IP (refer to FIG. 35).

The contents transmission server 10 transmits the SAP message periodically and repeatedly at a predetermined interval. Because the receiving terminal 20 starts to reproduce the broadcast media upon receiving the SAP message, it is desirable that the SAP message be transmitted in a cycle as short as possible.

Figure 3:
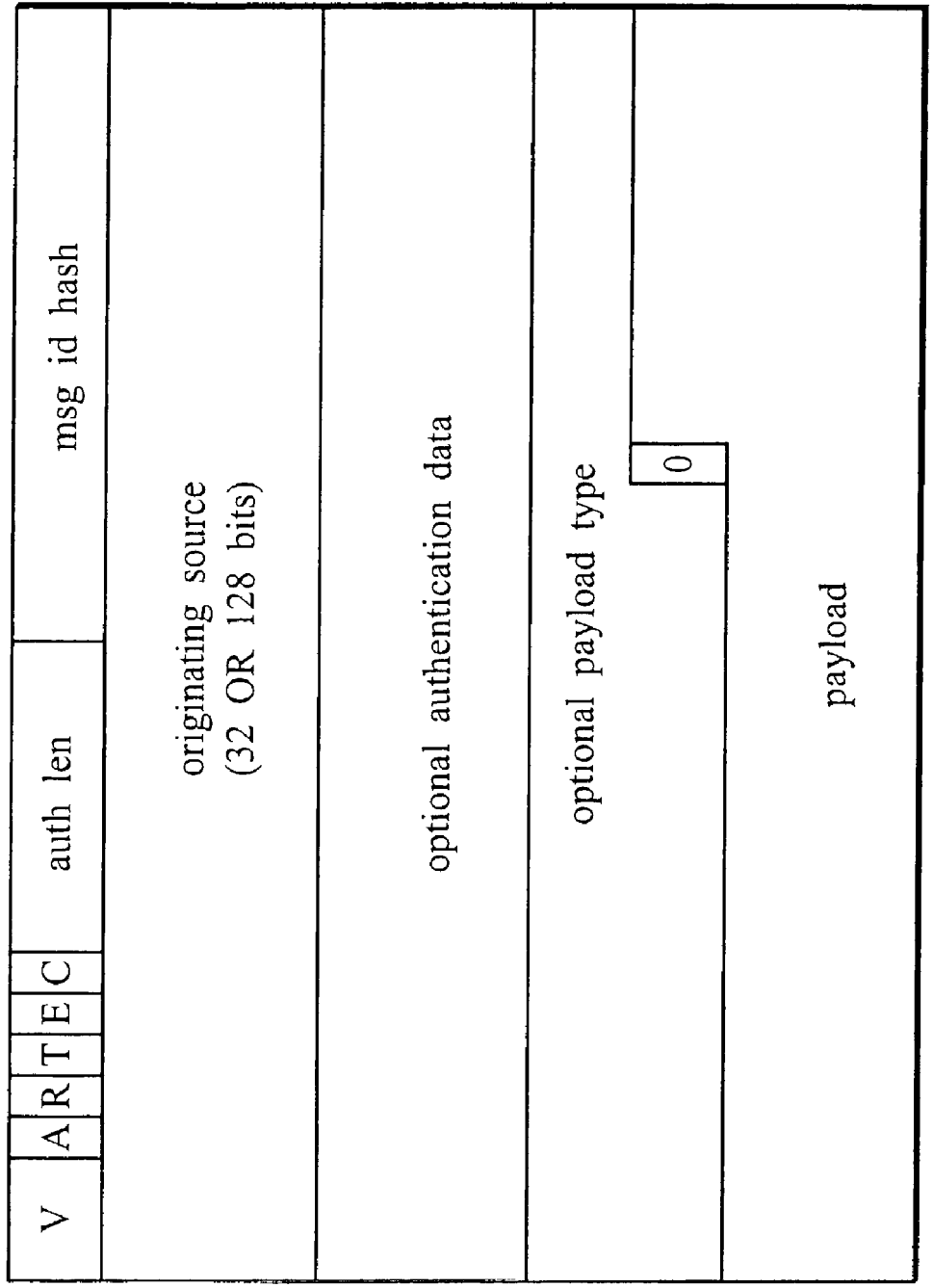
FIG. 3 is a diagram showing a SAP message for use in the broadcast communication system according to the one embodiment of the present invention.

The SAP message will be described with reference to FIGS. 3 and 4. FIG. 3 shows the format of the SAP message.

In FIG. 3, the reference symbol "V" denotes version information. The reference symbol "A" denotes an address type. When A=0, the address type is IPv4, and when A=1, the address type is IPv6. The reference symbol "R" denotes "Reserved".

The reference symbol "T" denotes a message type. When T=0, the symbol T indicates that the message is broadcast notification information, indicating the start of the broadcast, and when T=1, the symbol T indicates that the message is broadcast notification information indicating the end of the broadcast.

The reference symbol "E" denotes an "Encryption bit". The reference symbol "C" denotes a "Compression bit". The reference item "auth len" denotes a size of "optional authentication data".

The reference item "msg id hash" denotes a message ID that uniquely specifies the SAP message transmitted by a source (the contents transmission server 10 and the like), indicated by an IP address described in the "originating source".

The reference item "originating source" denotes the IP address of the source of the SAP message.

Here, the SAP message can be uniquely specified by combining the "msg id hash" and the "originating source".

The reference item "optional payload type" denotes a data type of the "payload". The "payload" will be described in detail in FIG. 4.

FIG. 4 shows an example of the "SDP information" described in the "payload" in the SAP message in this embodiment. "v=0" indicates the version of the "payload", which shows information for prescribing a method of describing the "payload". "o=" is source information, which includes the IP address information (126.16.64.4) of the source. "s=" is the session name of broadcast media. "c=" is a multicast address (IP address information of a destination) to which the broadcast media is transmitted. "t=" indicates the valid period of the broadcast media. "m=" is information indicating the broadcast media, designated by the SAP message. The SAP message shown in FIG. 4 designates, as the broadcast media, one piece of audio information, one piece of video information and one piece of carousel data.

Specifically, the description of "m=audio 3456 RTP/AVP 0", which designates the first broadcast media, indicates that the audio information is transmitted by a RTP packet in a port number specified by "3456".

Moreover, the description of "m=video 2232 RTP/AVP 98", which designates the second broadcast media, indicates that the video information is transmitted by a RTP packet in a port number specified by "2232".

Moreover, the description of "m=application 32416 udp dc" indicates that carousel data which is to be transmitted repeatedly is transmitted by use of a UDP packet.

Figure 5:
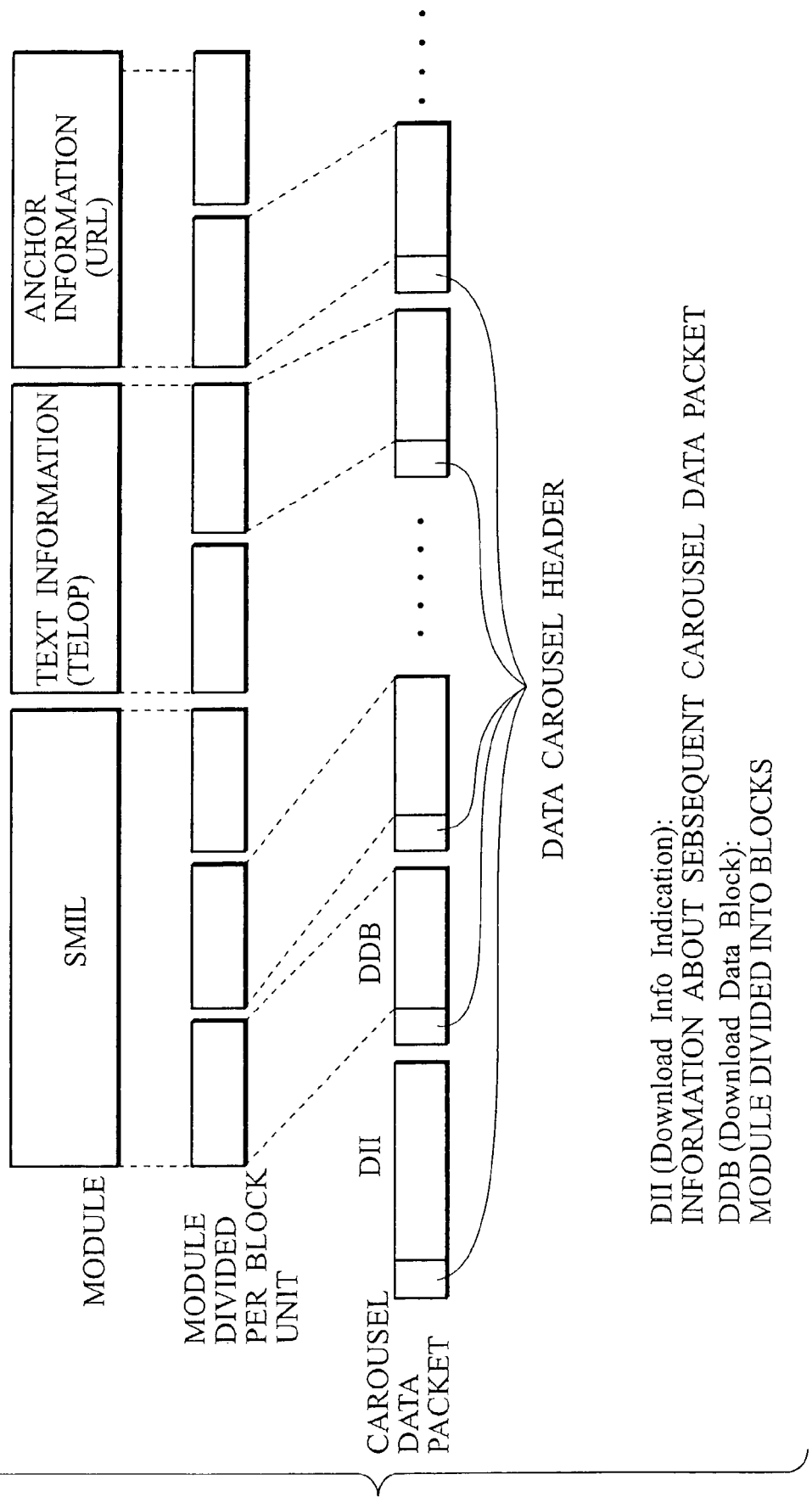
FIG. 5 is a diagram for explaining a data transmission system using a data carousel system for use in the broadcast communication system according to the one embodiment of the present invention.

Carousel data to be transmitted by the data carousel system will be described with reference to FIGS. 5 to 7. FIG. 5 shows an outline of a data transmission system using the data carousel system for use in this embodiment.

The carousel data is composed of a carousel data packet including "DII (Download Information Indication)" and a carousel data packet including one or more of "DDB (Download Data Block)".

"DII" includes information concerning a subsequent carousel data packet (DDB), and the "DDB" includes actual data (module divided per block unit). The "DII" will be described later in detail with reference to FIG. 6.

FIG. 5 shows an example of the case where each "DDB" includes three modules divided per block unit (that is, "SMIL", "text information (telop)" and "anchor information (URL)"). The contents of each module (file) will be described in detail later with reference to FIGS. 8 to 10.

As shown in FIG. 5, each module is divided per block unit. Furthermore, the respective modules divided per block unit are added with "data carousel headers", thus becoming "carousel data packets" constituting the "carousel data".

Figure 6:
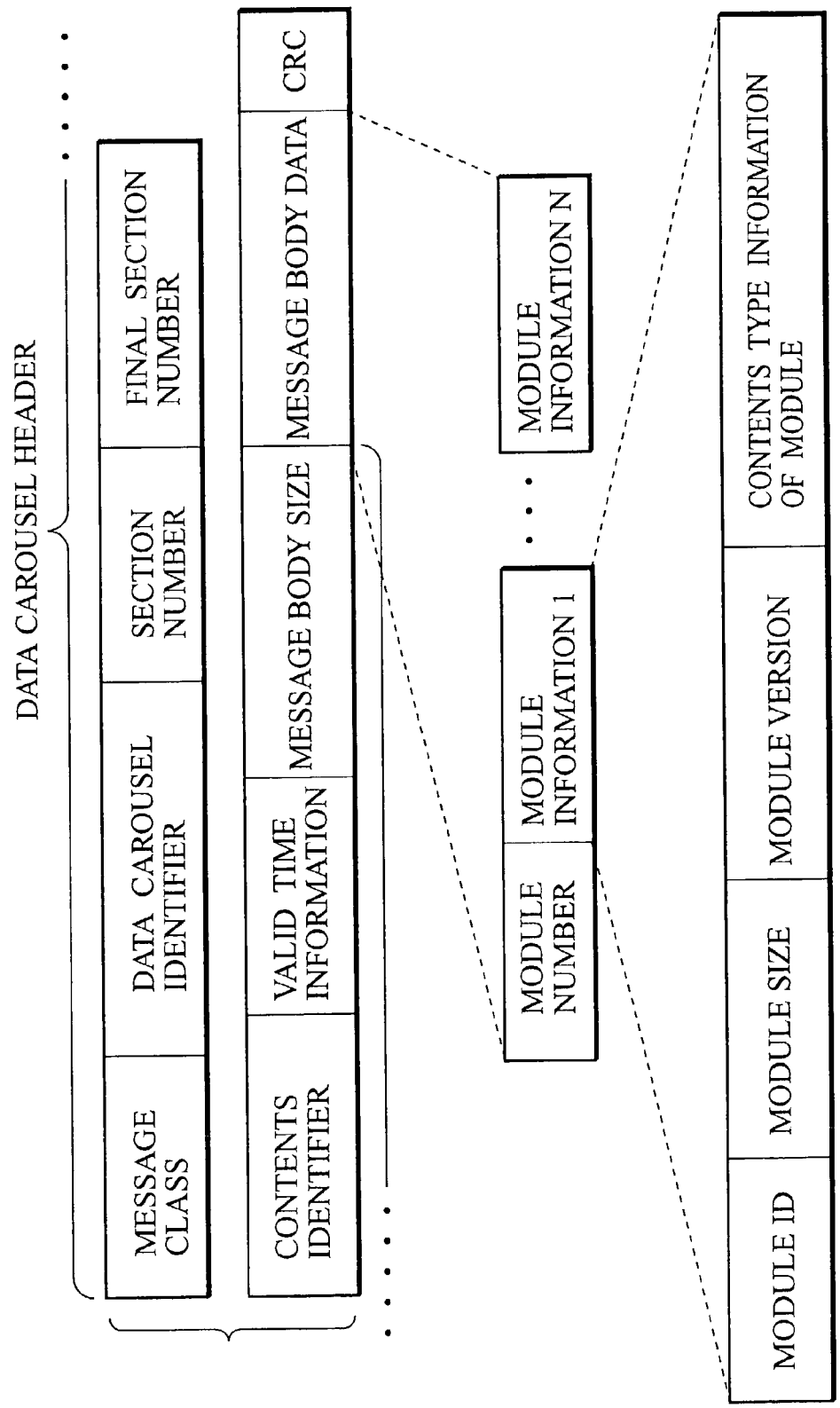
FIG. 6 is a diagram showing a data carousel packet (DII) for use in the broadcast communication system according to the one embodiment of the present invention.

FIG. 6 shows the contents of the "DII" to be transmitted by the data carousel system of this embodiment. As shown in FIG. 6, the "DII" is composed of the "data carousel header", the "message body data" and the "CRC" for detecting errors.

The "data carousel header" is composed of the "message class", the "data carousel identifier", the "section number", the "final section number", the "contents identifier", the "valid time information" and the "message body size".

The "message class" is information indicating whether the concerned carousel data packet includes the "DII" or the "DDB".

The "data carousel identifier" is identification information uniquely specifying the carousel data. The "section number" is identification information uniquely specifying the "carousel data packet" constituting the carousel data.

The "final section number" is information representing the number of carousel data packets in the carousel data. The "contents identifier" is version information, which is incremented when the contents of the carousel data packet are updated.

The "valid time information" represents time information regarding the time when the carousel data packet constituting the carousel data is valid, and is composed of information specifying the start and end of the valid time. In this embodiment, a "NTP time" is used as the "valid time information". Note that it is not necessary to set the "valid time information" definitively when there is no need to indicate the valid time.

The "message body data" is composed of the "number of modules" and the "module information 1 to N", the number of which is represented by the number of modules.

The "number of modules" represents the number of modules that are a semantically definite unit. As shown in FIG. 5, the module according to this embodiment corresponds to one file of the "SMIL", the "text information (telop)", the "anchor information (URL)" or the like.

The "module information" is composed of the "module ID", the "module size", the "module version" and the "contents type information of the module".

The "module ID" is identification information uniquely specifying the module in the carousel data. The "module size" is the data size of the module. The "module version" is the update information of the module. The "contents type information of the module" indicates the type of the contents included in the module (for example, text information in the plain format, text information in the HTML format and the like).

Figure 7:
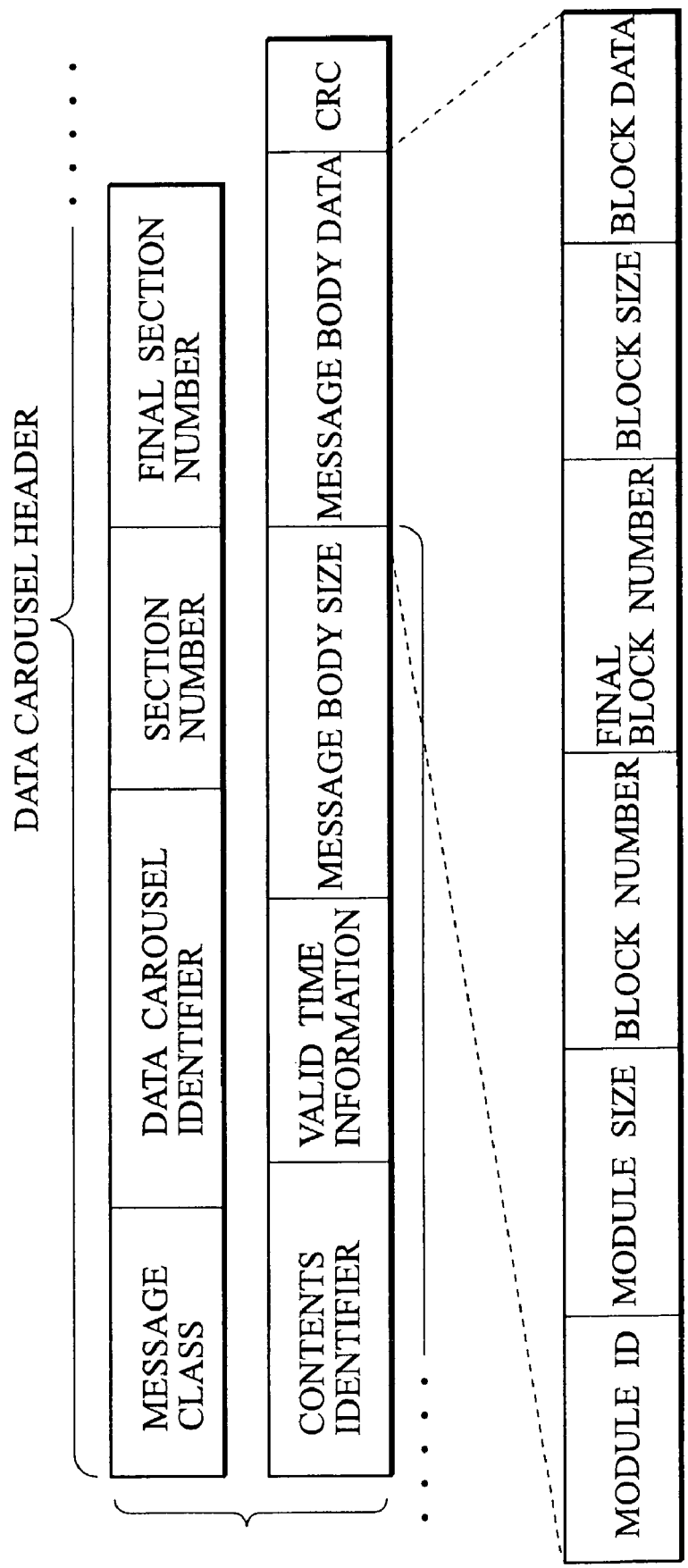
FIG. 7 is a diagram showing a data carousel packet (DDB) for use in the broadcast communication system according to the one embodiment of the present invention.

FIG. 7 shows the contents of the "DDB" to be transmitted by the data carousel system in this embodiment. As shown in FIG. 7, the "DDB" is composed of the "data carousel header", the "message body data" and the "CRC" for use in detecting errors.

Similarly to the "data carousel header" in the "DII" described with reference to FIG. 6, the "data carousel header" is composed of the "message class", the "data carousel identifier", the "section number", the "final section number", the "contents identifier", the "valid time information" and the "message body size".

The "message body data" is composed of the "module ID", the "module size", the "block number", the "final block number", the "block size" and the "block data".

The "module ID" is identification information uniquely specifying a module in the concerned carousel data. The "module size" is the data size of the module. The "block number" is an identifier uniquely identifying each of the blocks obtained by dividing the concerned module. The "final block number" indicates the number of blocks into which the module is divided. The "block size" indicates the data size of a subsequent block. The "block data" is data of the module divided per block unit.

Next, a description will be made for each module (file) to be transmitted by the data carousel system in this embodiment.

FIG. 8 shows a description example of the "SMIL" to be transmitted by the data carousel system in this embodiment. The "SMIL" includes the reproduction information such as "timing information" for use in performing time synchronization processing among the plurality of the broadcast media, and "layout information" for changing the display of the broadcast media on the display unit of the communication terminal. The "SMIL" is placed as the file (module) to be transmitted by the data carousel system.

The "SMIL" shown in FIG. 8 indicates that one piece of audio information, one piece of video information and two pieces of text information are reproduced simultaneously in synchronization with one another.

The description of "<audio src=":<port-a01>/" />" indicates that a port for the audio information, which is represented in the SAP message, should be referred to.

The description of "<video src=":<port-v01>/" region="a"/>" indicates that a port for the video information, which is represented in the SAP message, should be referred to.

The description of "<text src="~/module01" region="b"/>" indicates that text information represented by the "module01", included in the carousel data through which the "SMIL" is transmitted should be referred to.

The description of "<text src="~/module02" region="c"/>" indicates that text information represented by the "module02", included in the carousel data through which the "SMIL" is transmitted should be referred to.

Moreover, the description of "<layout>~</layout>" indicates "layout information" designating a layout (display area) in which the audio information, the video information and the text information are displayed on the display unit of the receiving terminal 20.

Figures 9, 10, 11:
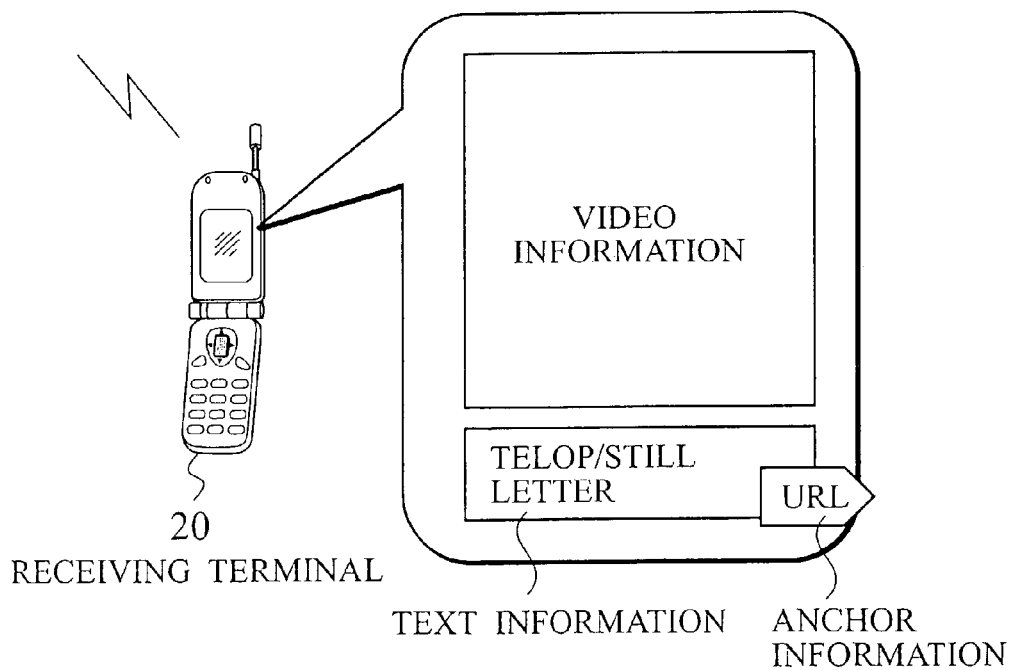
FIG. 9 is a diagram showing a description example of text information for use in the broadcast communication system according to the one embodiment of the present invention.
FIG. 10 is a description example of anchor information for use in the broadcast communication system according to the one embodiment of the present invention.
FIG. 11 is a diagram illustrating a display image of broadcast media in a communication terminal according to the one embodiment of the present invention.

FIG. 9 is a description example of the text information (telop) to be referred to by the description of "<text src="/module01" region="b"/>" in the "SMIL" of FIG. 8.

FIG. 10 is a description example of the anchor information (URL) to be referred to by the description of "<text src="~/module02" region="c"/>" in the "SMIL" of FIG. 8.

Note that the data carousel system transmits the same data repeatedly, and can capture and transmit the timing information concerning synchronization among the respective broadcast media, the layout information, the anchor information (URL) linked with a caption and an uplink, the still-image information, the text information (telop and still letters), the moving-image information, the audio information and the like, as the data to be transmitted repeatedly.

Next, the operation of the receiving terminal 20 receiving the SAP message will be described. Specifically, a description will be made for the operation of the receiving terminal 20, which starts from the reception of the SAP message and ends at the reproduction of the received broadcast media.

First, the receiving terminal 20 that has received the SAP message starts the reception of the broadcast media (RTP packet) by taking the reception of the SAP message (broadcast notification information) as a trigger.

Second, the receiving terminal 20 refers to the SAP message, and thus acquires the reproduction information such as the "IP address" (to which the broadcast media such as the audio information, the video information and the carousel data is transmitted), the "port number" and the "RTP payload type" necessary to reproduce the respective broadcast media.

For example, the receiving terminal 20 that has received the SAP message shown in FIG. 4 acquires the "IP address (multicast address)" to which the broadcast media is transmitted by the description of "c=IN IP4 224.2.17.12/127".

The receiving terminal 20 transmits the audio information through the port identified by the port number "3456" in the RTP packet, according to the analysis of the description of "m=audio 3456 RTP/AVP 0", which designates the first broadcast media.

The receiving terminal 20 transmits the video information through the port identified by the port number "2232" in the RTP packet, according to the analysis of the description of "m=video 2232 RTP/AVP 98", which designates the second broadcast media.

Furthermore, the receiving terminal 20 transmits the carousel data through the port identified by the port number "32416" on the UDP packet, according to the analysis of the description of "m=application 32416 udp dc".

Third, the receiving terminal 20 that has performed the above-described analysis for the broadcast media, prepares for receiving processing of the broadcast media and waits for the broadcast media to be broadcasted.

Fourth, in this embodiment, a "RTCP (RTP control protocol) message" which is time synchronization information (timing information) is transmitted following the SAP message Fifth, the receiving terminal 20 that has received the RTCP message acquires the time synchronization information (timing information) from among the respective media by correspondence information between a "NTP time stamp" and a "RTP time stamp" (NTP-RTP-associated information), which are included in the RTCP message. Thus, the time synchronization information (timing information) regarding the interaction between the broadcast media of the audio information and video information is acquired.

Sixth, the carousel data divided into the plurality of block units is transmitted, which the receiving terminal 20 analyzes upon. The receiving terminal 20 receives the entire carousel data divided into the plurality of block units. Note that, in this embodiment, the carousel data is broadcasted in the intermission of the broadcast of the audio information and video information.

Seventh, if the receiving terminal 20 receives the audio information and the video information, which are transmitted in the RTP packet, then the receiving terminal 20 performs the reproduction processing in a streaming format, while synchronizing the respective broadcast media by taking a time axis for use in the NTP time stamp (NTP time) as a reference.

Note that when quick reproduction of the video information is desired to be performed in the receiving terminal 20 before receiving the layout information broadcasted in the carousel data, the reproduction is started at once by predetermined layout information, and then the layout information is received. If the layout is defined as a result of the information analysis, then re-layout may satisfactorily be made.

Note that the contents transmission server 10 may broadcast the carousel data in the intermission of the broadcast of the audio information and the video information, or alternatively, may broadcast the carousel data prior to the broadcast of the audio information and the video information after the transmission of the SAP message. In the latter case, the receiving terminal 20 receiving the broadcast media can process control information concerning the reproduction of the broadcast media prior to the reception of the broadcast media of the audio information and video information.

The carousel data received by the receiving terminal 20 prior to the audio information and the video information may not be the entire carousel data, and important information for the reproduction of the broadcast media may be broadcasted prior to the reproduction of the broadcast media. Here, the important information is the layout information and the like, in the reproduction of the video information.

Next, a description will be made for the operation in the receiving terminal 20 that repeatedly receives the SAP message to be transmitted periodically and repeatedly.

First, the receiving terminal 20 verifies the "msg id hash (message ID)" and the "originating source", which are included in the SAP message, and thus determines whether or not the SAP message is updated.

Here, when a change is made regarding the broadcast media, the "message ID" included in the SAP message is updated. The "message ID" is information uniquely identifying the SAP message as being transmitted from the same "originating source".

Second, if the update of the SAP message is shown, then the "payload" included in the SAP message is verified.

For example, when the "port number" and a "codec type", through which the audio information and the video information are transmitted are changed, the "message ID" included in the SAP message is changed.

Note that, though not shown in FIG. 2, the time synchronization information (timing information) which associates the NTP time and the RTP time with each other, is sent by use of the RTCP message in this embodiment.

Here, a description will be made for a method for associating the data (HTML and the like) sent in the data carousel system and the audio and video information sent in the RTP packet with each other on a time basis in the receiving terminal 20.

From the RTCP message corresponding to each RTP packet, the receiving terminal 20 acquires the NTP-RTP-associated information, associating the NTP time and the RTP time with each other.

The "valid time information (NTP time stamp)" indicating a time when the carousel data is valid is acquired by the data carousel system. The "NTP time stamp" includes a "starting NTP time stamp" indicating a time when the carousel data becomes valid, and an "ending NTP time stamp" indicating a time when the carousel data becomes invalid.

Third, the receiving terminal 20 that has received the RTP packet including the audio information and video information performs the reproduction processing for the audio and video information included in the RTP packet in synchronization with the time axis (NTP time), for use in the NTP time stamp based on the NTP-RTP-associated information by means of the RTP time stamp included in the RTP packet.

Moreover, in the reproduction processing for the audio information and the video information, the receiving terminal 20 performs data processing such as the displaying of carousel data (text information and the like) received by the data carousel system in response to the "valid time information (NTP time stamp)" indicating the time when the carousel data becomes valid.

Note that the "ending NTP time stamp" may not be the time information indicating the time when the carousel data becomes invalid but may be period information indicating the valid period of the carousel data.

FIG. 11 is a display image diagram on the receiving terminal 20 in this embodiment. As shown in FIG. 11, the text information (telop and still-letters) and the anchor information (URL) are displayed in synchronization with the reproduction processing for the video information and the audio information.

Note that, in this embodiment, the "NTP-RTP-associated information" associating the NTP time and the RTP time with each other is notified by the RTCP message in consideration of an affinity with the Internet. However, if temporal processing is possible, such as synchronization processing among the respective broadcast media in the receiving terminal 20, for example, the notification of "NTP-RTP-associated information" (while being included in the SAP message without using the RTCP message), then other methods than the above may be used.

For example, the time synchronization information (timing information) among the respective broadcast media may be included in the SAP message, or alternatively, the time synchronization information (timing information) may be included in the "SMIL".

Second Embodiment

The second embodiment of the present invention shows a case where the receiving terminal 20 receives the "SAP message" including essential processing information indicating essential processing which is to be performed prior to reproducing the broadcast media.

Here, a description will be made for the operation of the receiving terminal 20 when receiving the SAP message having the "payload" shown in FIG. 12, instead of the SAP message having the "payload" shown in FIG. 4.

In the SAP message having the "payload" shown in FIG. 12, the description of "require=mid:3;"module00"=http://docomo.ne.jp/layout01.smil" indicating the essential processing information is included.

The essential processing indicated by the above essential processing information indicates that the broadcast media identified by the broadcast media identification information "mid: 3" will be processed, particularly that "module00" will be processed for the broadcast media. Herein, the broadcast media identified by "mid: 3" is the carousel data, and "module00" is the "SMIL"

Figure 13:
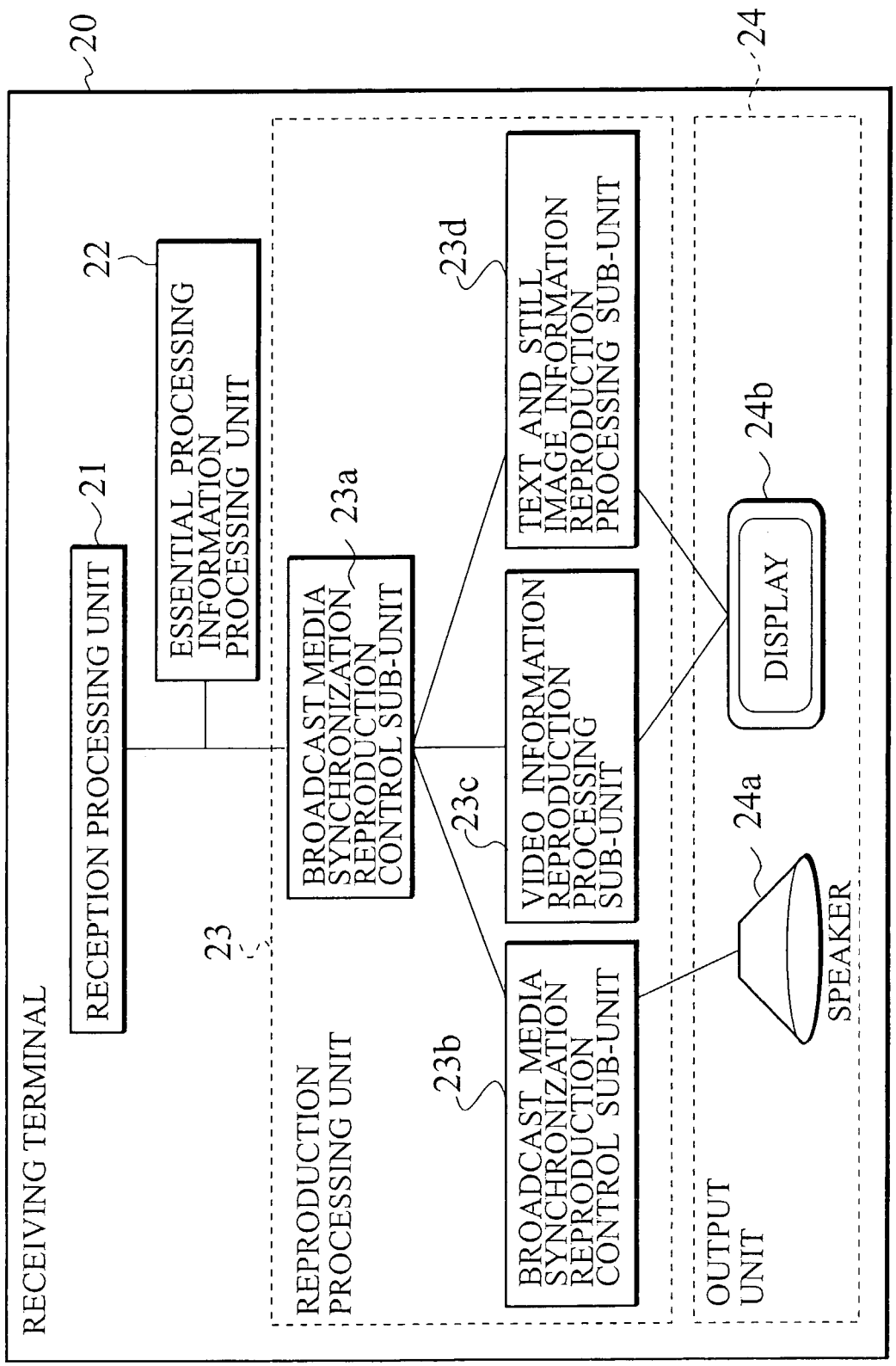
FIG. 13 is a function block diagram of a mobile communication terminal according to the one embodiment of the present invention.

FIG. 13 shows a constitution of the receiving terminal 20 for processing the SAP message including the essential processing information.

As shown in FIG. 13, the receiving terminal 20 is composed of the reception processing unit 21 for receiving the broadcast media, the essential processing information processing unit 22, the reproduction processing unit 23 and the output unit 24.

The reproduction processing unit 23 is composed of the broadcast media synchronization reproduction control sub-unit 23a, the audio information reproduction processing sub-unit 23b, the video information reproduction processing sub-unit 23c and the text and still-image information reproduction processing sub-unit 23d. Moreover, the output unit 24 is composed of the speaker 24a and the display 24b outputting reproduced information.

The essential processing information processing unit 22 determines whether or not the essential processing information is included in the broadcast notification information (SAP message) received by the reception processing unit 21. When the essential processing information is included in the broadcast notification information (SAP message), the essential processing information processing unit 22 instructs the essential processing which is to be performed prior to the reproduction processing of the respective broadcast media in the broadcast media synchronization reproduction control sub-unit 23a.

Next, a processing flow in the receiving terminal 20, when receiving the SAP message including the essential processing information shown in FIG. 12 will be described with reference to FIG. 14.

Figure 14:
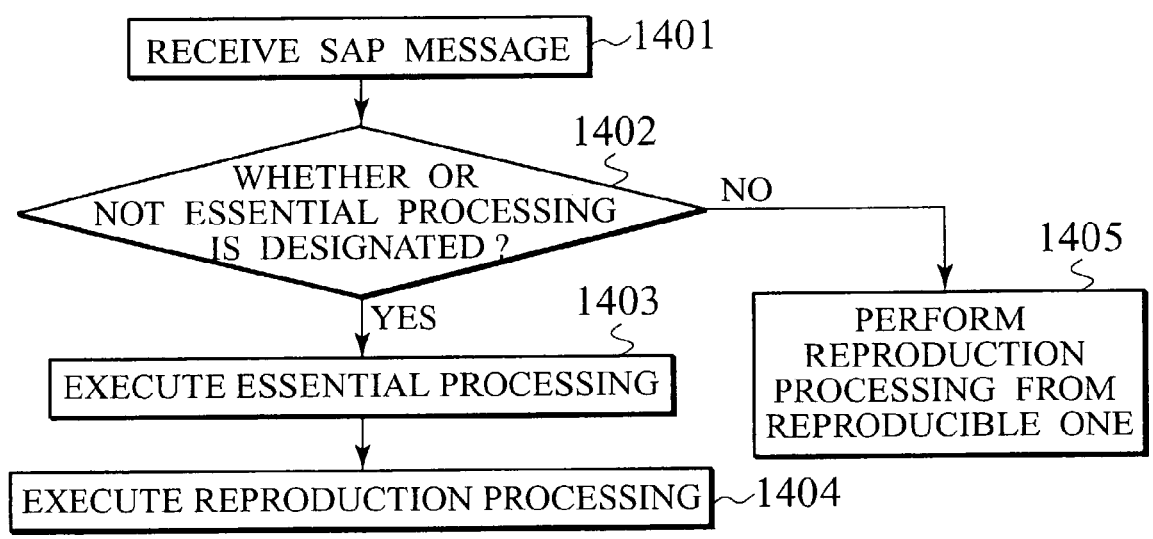
FIG. 14 is a flowchart illustrating an operation of the mobile communication terminal according to the one embodiment of the present invention.

As shown in FIG. 14, in Step 1401, the reception processing unit 21 receives the SAP message and acquires the IP address information (multicast address) through which the broadcast media is broadcasted, the time synchronization information (timing information) and the reproduction information of the respective broadcast media.

In Step 1402, the essential processing information processing unit 22 determines whether or not the essential processing information is included in the SAP message. If the essential processing information is included therein, the essential processing information processing unit 22 analyzes the essential processing information and notifies the contents of the analysis to the broadcast media synchronization reproduction processing sub-unit 23a. Thus, this flow advances to Step 1403. On the other hand, if the essential processing information is not included therein, this flow advances to Step 1405.

In Step 1403, the broadcast media synchronization reproduction processing sub-unit 23a executes the essential processing indicated in the notified essential processing information. Then, upon receiving the respective broadcast media sequentially, the broadcast media synchronization reproduction processing sub-unit 23a instructs the respective reproduction processing sub-units 23b to 23d for reproduction while referring to the essential processing information and the reproduction information of the respective broadcast media. The broadcast media synchronization reproduction processing sub-unit 23a retains the essential processing information and the reproduction information of the respective broadcast media.

In Steps 1404 and 1405, the reproduction processing units 23b to 23d, which have received the reproduction instruction, perform the reproduction processing of the broadcast media.

The essential processing information in this embodiment indicates that the processing of the SMIL is performed. If the processing of the SMIL has already been performed in the case of reproducing the respective broadcast media of the audio information and the video information, the reproduction of the broadcast media is performed, and if not, the reproduction of the broadcast media is not started.

Note that, in this embodiment, the ID uniquely specifying the file (essential processing information) indicating the essential processing, ("http://docomo.ne.jp/layout01.smir"), URL information is used. Thus, the inclusion of the ID uniquely specifying the essential processing information in the SAP message enables the essential processing which is to be specified without completing the reception of the file indicating the essential processing information (for example, "SMIL" and the like) and enables the reproduction to be started quickly.

Moreover, the use of the URL information as in the above-described ID, enables the essential processing information to be acquired by accessing other devices connected via a network even if the previous essential processing information has not been retained. The use of the URL information provides the information necessary for optional processing, (which is not limited to the essential processing information), to be acquired not only by broadcasting but also from the other devices connected via the network according to needs.

Third Embodiment

The third embodiment of the present invention shows the case where the receiving terminal 20 receives the SAP message including the layout information as the reproduction information, prior to the reproduction of the broadcast media.

FIG. 15 is a description example of the "payload" in the "SDP information" in the SAP message including the layout information.

As shown in FIG. 15, by the description of "layout="http://docomo.ne.jp/layout01.smil";cid=docomo0123", the layout information for use when reproducing the broadcast media is uniquely specified.

Figure 16:
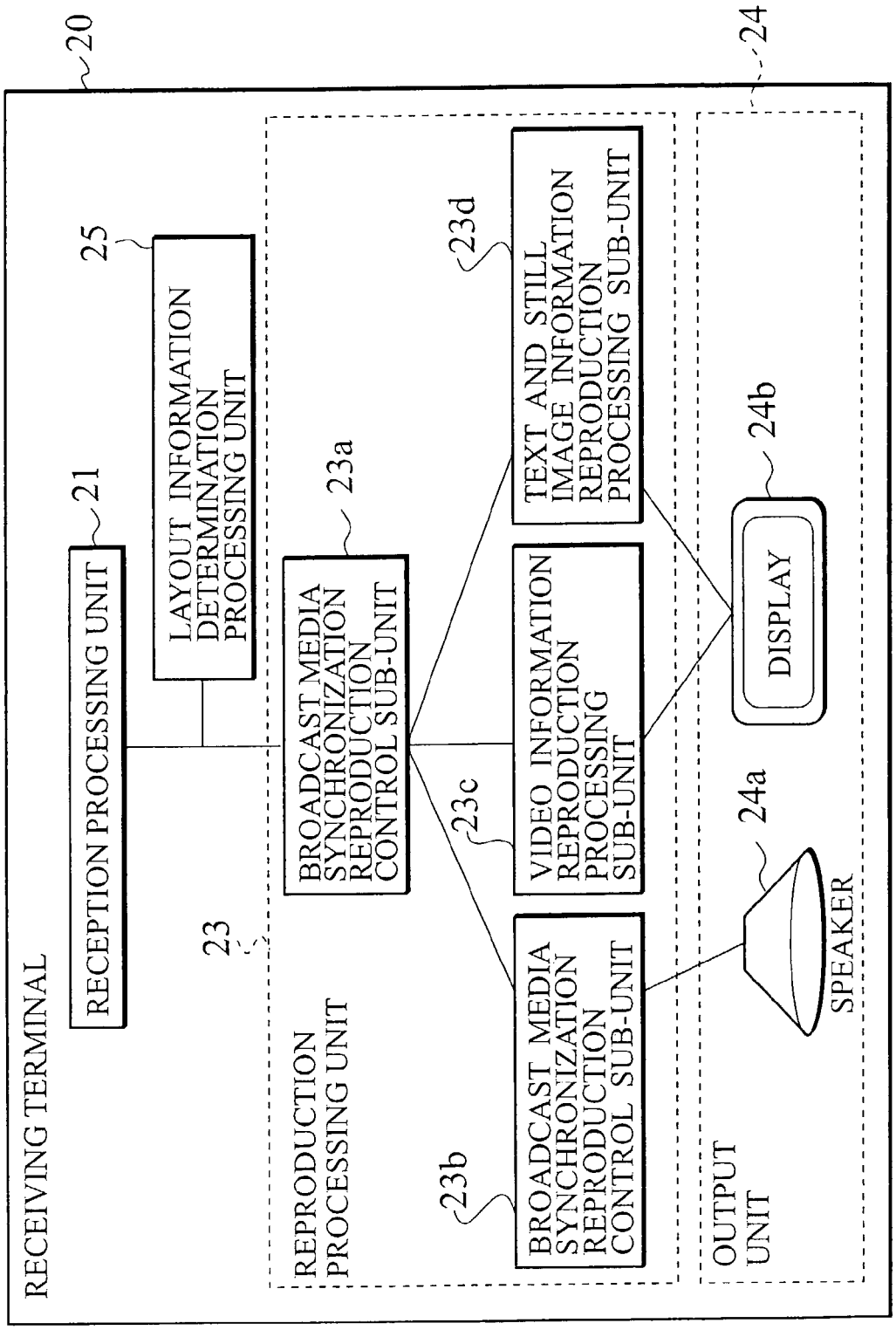
FIG. 16 is a function block diagram of a communication terminal according to the one embodiment of the present invention.

FIG. 16 is a constitutional view of the receiving terminal 20 in this embodiment.

As shown in FIG. 16, the receiving terminal 20 is composed of the reception processing unit 21 for receiving the broadcast media, the layout information determination processing unit 25, the reproduction processing unit 23 and the output unit 24.

The reproduction processing unit 23 is composed of the broadcast media synchronization reproduction control sub-unit 23a, the audio information reproduction processing sub-unit 23b, the video information reproduction processing sub-unit 23c and the text and still-image information reproduction processing sub-unit 23d. Moreover, the output unit 24 is composed of the speaker 24a outputting the reproduction information and the display 24b.

The layout information determination processing unit 25 determines whether or not the layout information is included in the broadcast notification information (SAP message) received by the reception processing unit 21. If the layout information is included in the broadcast notification information (SAP message), the layout information determination processing unit 25 notifies an effect thereof to the broadcast media synchronization reproduction control sub-unit 23a.

Here, by use of a flowchart shown in FIG. 17, the operation of the receiving terminal 20 when receiving the SAP message including the layout information shown in FIG. 15 will be described.

Figure 17:
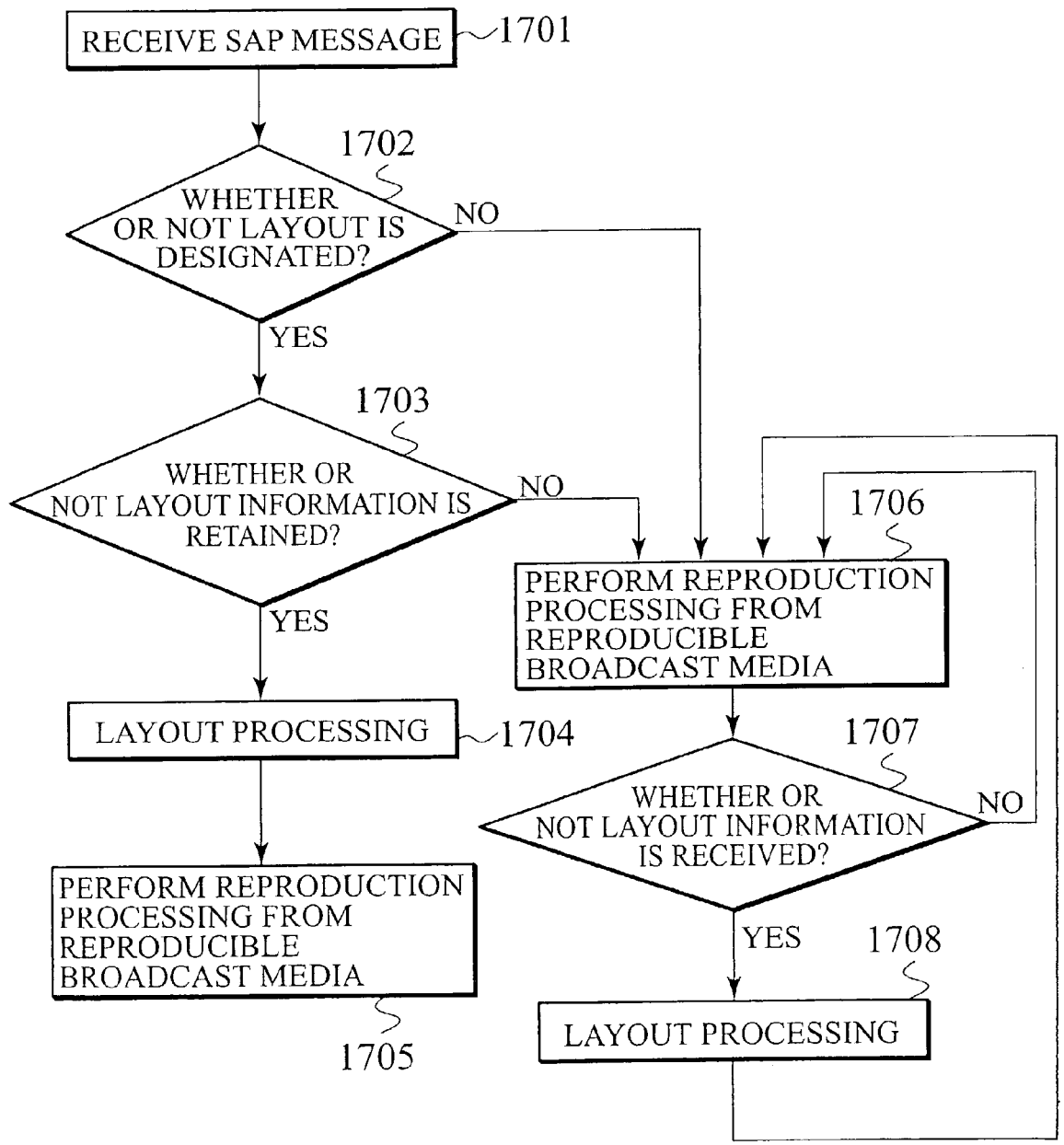
FIG. 17 is a flowchart illustrating an operation of the communication terminal according to the one embodiment of the present invention.

As shown in FIG. 17, in Step 1701, the reception processing unit 21 of the receiving terminal 20 that has received the SAP message determines whether or not the received message is the SAP message and analyzes the SAP message. Herein, from the SAP message, the reception processing unit 21 acquires address information and reproduction information regarding broadcast media to be received thereafter.

In Step 1702, the layout information determination processing unit 25 determines whether or not an ID of the layout information related to the broadcast media is included in the received SAP message.

If the ID of the layout information is included therein, in Step 1703, the layout information determination processing unit 25 determines whether or not the layout information indicated by the ID has already been retained in the receiving terminal 20.

If the layout information has already been retained therein, in Step 1704, the layout information determination processing unit 25 notifies the retained layout information to the broadcast media synchronization reproduction control sub-unit 23a. Then, the broadcast media synchronization reproduction control sub-unit 23a performs layout processing based on the notified layout information.

In Step 1705, when the respective reproduction processing unit 23b to 23d receives the respective broadcast media to be displayed on the display, reproduction display is performed based on the layout information that has already been processed.

Note that, when the layout information indicated by the above-described ID is not retained in the receiving terminal 20, in Step 1706, the receiving terminal 20 acquires the layout information from information to be broadcasted subsequently or from the other devices via the network.

The use of the URL information as the ID of the layout information enables data to be acquired easily by using HTTP, which is generally used on the Internet.

Fourth Embodiment

In the fourth embodiment of the present invention, a description will be made by use of FIGS. 18 and 19 for an example of designating the essential processing performed between a plurality of broadcast media in association with each other.

FIG. 18 shows the "SMIL" transmitted in the data carousel system, in which the description of "require="id:v1"" indicates that it is essential to perform reproduction display of the video information identified by "id="v1"" simultaneously with the display of the second text information.

Figure 19:
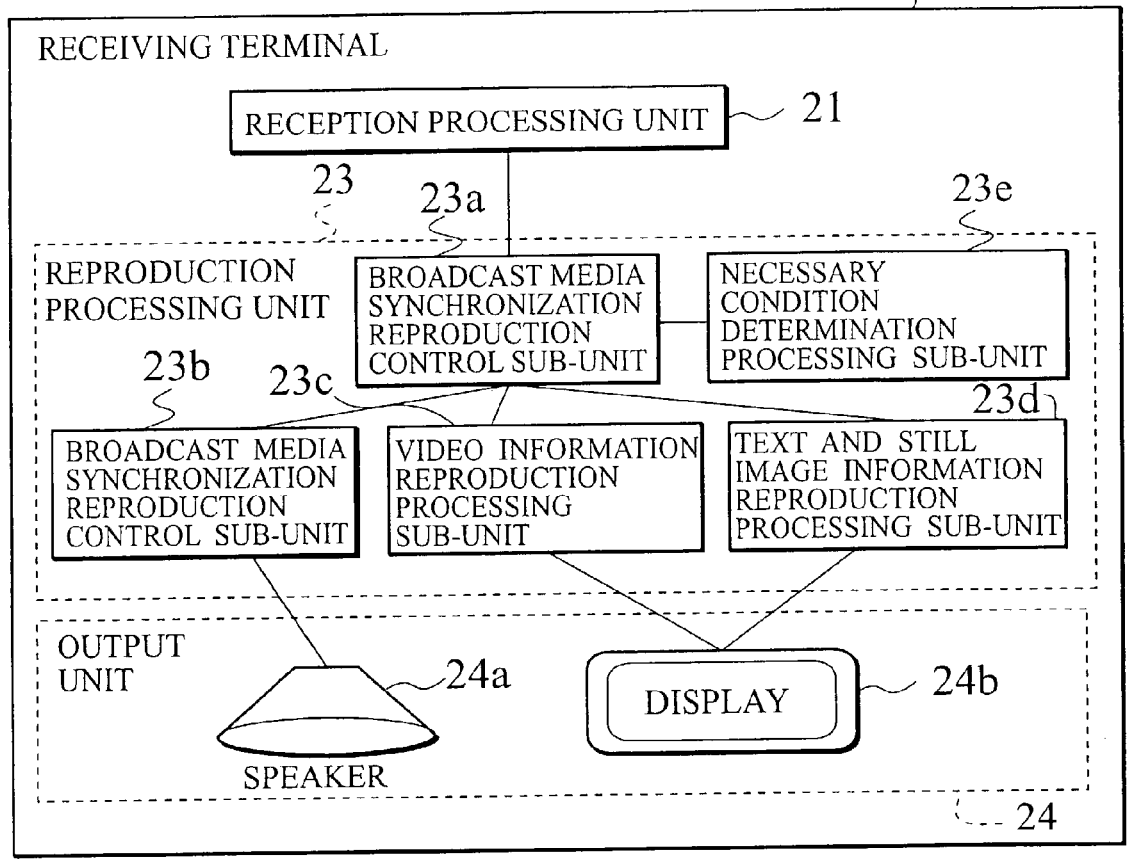
FIG. 19 is a function block diagram of a communication terminal according to the one embodiment of the present invention.

FIG. 19 is a constitutional view of the receiving terminal 20 in this embodiment.

The receiving terminal 20 is composed of the reception processing unit 21 for receiving the broadcast media, the reproduction processing unit 23 and the output unit 24.

The reproduction processing unit 23 is composed of the broadcast media synchronization reproduction control sub-unit 23a, the audio information reproduction processing sub-unit 23b, the video information reproduction processing sub-unit 23c, the text and still-image information reproduction processing sub-unit 23d and the necessary condition determination processing sub-unit 23e. Moreover, the output unit 24 is composed of the speaker 24a outputting the reproduction information, and the display 24b.

When the broadcast media synchronization reproduction control sub-unit 23a performs the synchronization reproduction processing of the respective broadcast media based on the "SMIL" received by the reception processing unit 21, the necessary condition determination processing sub-unit 23e determines the contents (essential processing) to be performed simultaneously with the reproduction of a certain broadcast media. In this embodiment, when the second text information is reproduced, it is determined that the reproduction of the video information is simultaneously requested as the essential processing.

Specifically, in this embodiment, the description of "require="id:v1""of the "SMIL" shown in FIG. 18 corresponds to the contents of the processing which is to be performed by the receiving terminal 20 simultaneously with the reproduction of the broadcast media (that is, the essential processing information).

Fifth Embodiment

In this embodiment, by use of FIG. 1 and FIGS. 20 to 22, a description will be made for an example of transmitting the "I picture frame", that is, a video information packet to which predictive coding is not performed in synchronization with the transmission of the SAP message.

Figure 20:
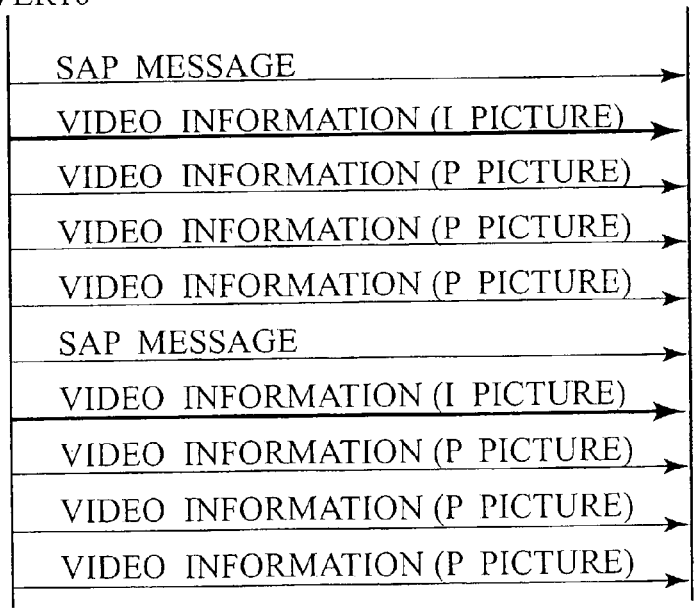
FIG. 20 is a sequence diagram of a broadcast communication system according to one embodiment of the present invention.

FIG. 20 is a sequence diagram showing an operation of the contents transmission server 10 broadcasting the video information to the receiving terminal 20.

As shown in FIG. 20, the contents transmission server 10 repeatedly transmits to the receiving terminal 20, the broadcast media and the SAP message containing the reproduction information indicating the reproduction method for the broadcast media and the like. By receiving the SAP message, the receiving terminal 20 can acquire the reproduction information of the respective broadcast media such as the audio information, the video information and the like.

As a coding method of the video information, "predictive coding" that is, a method capable of reproducing a current frame image by referring to a previous frame image or an adjacent frame image (other broadcast media) is known. For example, the "P picture frame" is a frame image coded by use of the "predictive coding".

On the other hand, the "I picture frame" is a video information frame, reproducible only by the current frame image without performing the "predictive coding". Specifically, the "I picture frame" can be reproduced without referring to the other broadcast media.

In other words, in order to decode the video information frame, it is necessary to know a dependency relation between the video information frame and another video information frame. Therefore the broadcast media, that is received immediately after the reception of the broadcast media is started, cannot always be decoded correctly.

For example, when the MPEG format is assumed, the I picture frame can be decoded only by the I picture frame. However, since the P picture frame is difference information from the previous video information frame, in order to decode the P picture frame, it is necessary that the previous video information frame be decoded correctly.

Therefore, even if the broadcast media composed of the P picture frame is received immediately after receiving the SAP message, the video information frame cannot be immediately decoded. Thus, the receiving terminal 20 has to wait for the reproduction of the broadcast media, until the next I picture frame is transmitted.

In order to reduce such a waiting time, the contents transmission server 10 sets the video information transmitted after transmitting the SAP message, to be the broadcast media composed of the I picture frame.

As an example of transmitting the broadcast media composed of the "I picture frame" immediately after the transmission of the SAP message, the following two examples will be described: one showing the case where the video information is coded by the contents transmission server 10 in real time; and the other showing the case where the SAP message is transmitted in accordance with the previously prepared video information.

Figure 21:
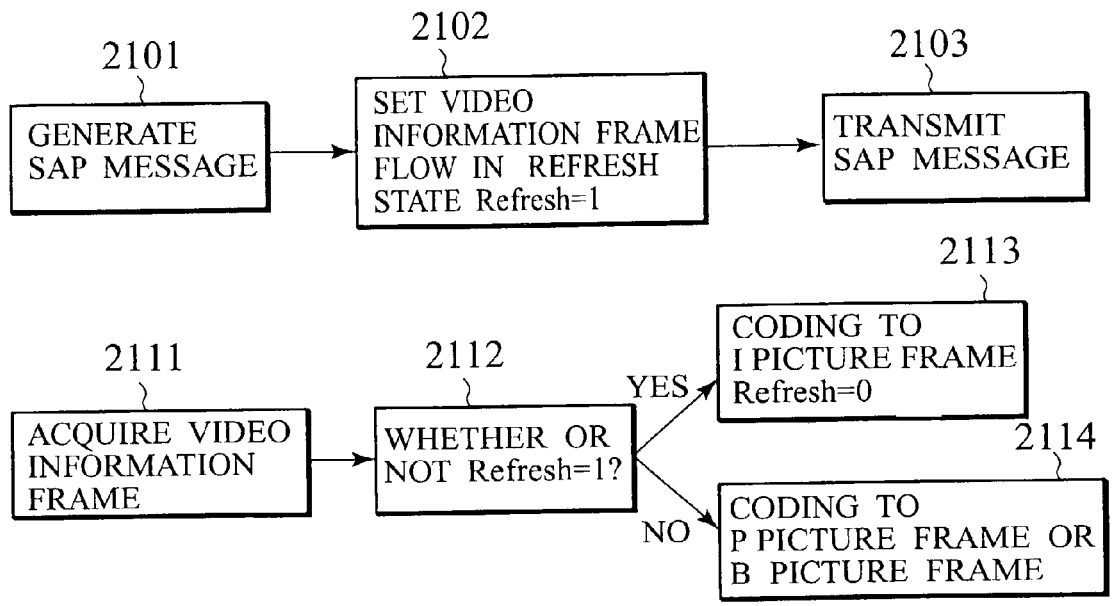
FIG. 21 is a flowchart illustrating an operation of a server according to the one embodiment of the present invention.

First, by use of a flowchart of FIG. 21, the example of the case where the video information is coded by the contents transmission server 10 in real time. FIG. 21 shows a control example of the case where the video information frame is coded by the contents transmission server 10 in real time.

As shown in FIG. 21, in Step 2101, the contents transmission server 10 generates a SAP message when the transmission timing of the SAP message arrives.

In Step 2102, the contents transmission server 10 sets a flow of the video information frame in a "refresh state (Refresh=1)". In Step 2013, the contents transmission server 10 transmits the SAP message to the receiving terminal 20.

Meanwhile, in Step 2111, the contents transmission server 10 acquires the video information frame to be transmitted. In Step 2112, the contents transmission server 10 determines whether or not the acquired video information frame is in the "refresh state (Refresh=1)".

When the acquired video information frame is in the "refresh state (Refresh=1)", in Step 2113, the contents transmission server 10 codes the video information frame into the "I picture frame" and sets the video information flow in a "non-refresh state (Refresh=0)".

On the other hand, when the video information frame is in the "non-refresh state (Refresh=0)", the contents transmission server 10 codes the video information frame into the P picture frame or a B picture frame.

Note that, although the example of using the SAP message was described in this embodiment, the present invention is not limited thereto and can be applied to the case of using the H.245 message instead of the SAP message in a circuit-switching broadcast communication system to be described later. In this case, taking the H.245 message as a trigger, the video information frame is coded into the I picture frame. Specifically, also in this case, the video information frame is coded into the I picture frame in synchronization with the broadcast notification information (H.245 message). The above-described example, that is, the sequence of transmitting the I picture frame after the contents transmission server 10 transmits the H.245 message will be described in FIG. 34 to be described later.

Figure 22:
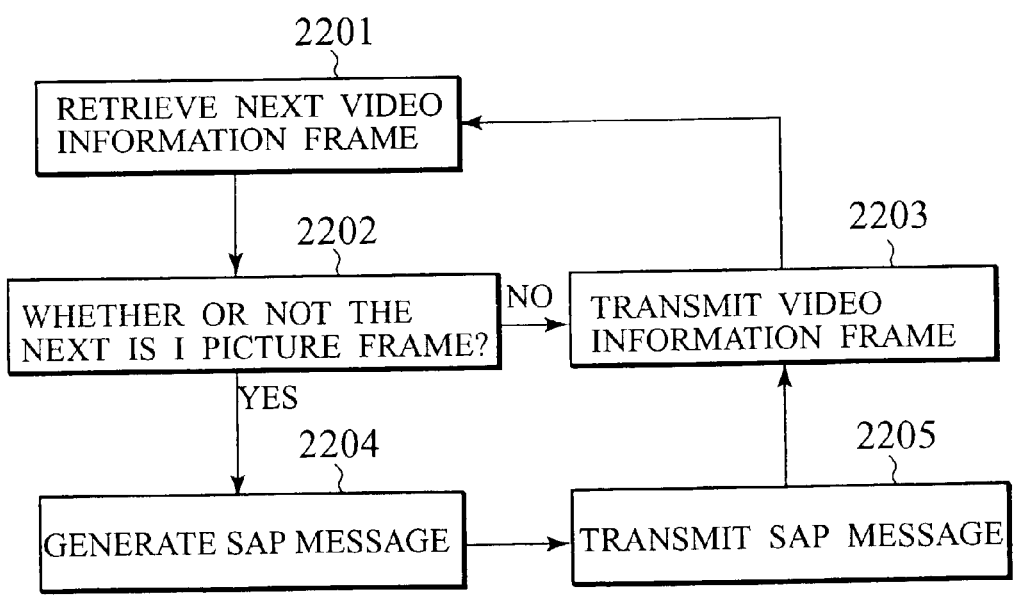
FIG. 22 is a flowchart illustrating an operation of a server according to the one embodiment of the present invention.

Next, by use of the flowchart of FIG. 22, an example of the case of transmitting the SAP message in accordance with the previously prepared video information (broadcast media) will be described. FIG. 22 shows a processing flow in the contents transmission server 10 when the video information (broadcast media) is previously coded.

As shown in FIG. 22, in Step 2201, the contents transmission server 10 retrieves the video information frame to be transmitted next, from a contents file. In Step 2202, the contents transmission server 10 determines whether the retrieved video information frame to be transmitted next is the I picture frame or not.

If the video information frame is not the I picture frame, in Step 2203, the contents transmission server 10 transmits the video information frame as it is.

On the other hand, if the video information frame is the I picture frame, in Step 2204, the contents transmission server 10 generates the SAP message before transmitting the video information frame. After transmitting the SAP message in Step 2205, the contents transmission server 10 transmits the video information frame composed of the I picture frame in Step 2203.

By such a control as described above, the frequency of transmitting the SAP message can be suppressed to the minimum. At the same time, the receiving terminal 20 can immediately start the decoding of the video information frame after receiving the SAP message, thus eliminating needless work.

Note that, although the example of using the SAP message was described in this embodiment, the present invention is not limited thereto. In the case of the circuit-switching broadcast communication system, the H.245 message can be used instead of the SAP message. In this case, the H.245 message is generated and transmitted immediately before transmitting the I picture frame.

Note that, in this embodiment, the method of synchronizing the SAP message and the I picture frame of the video information frame by the contents transmission server 10 is described. However, the relay apparatus 30 may perform the processing of synchronizing the same.

Sixth Embodiment

Figure 23:
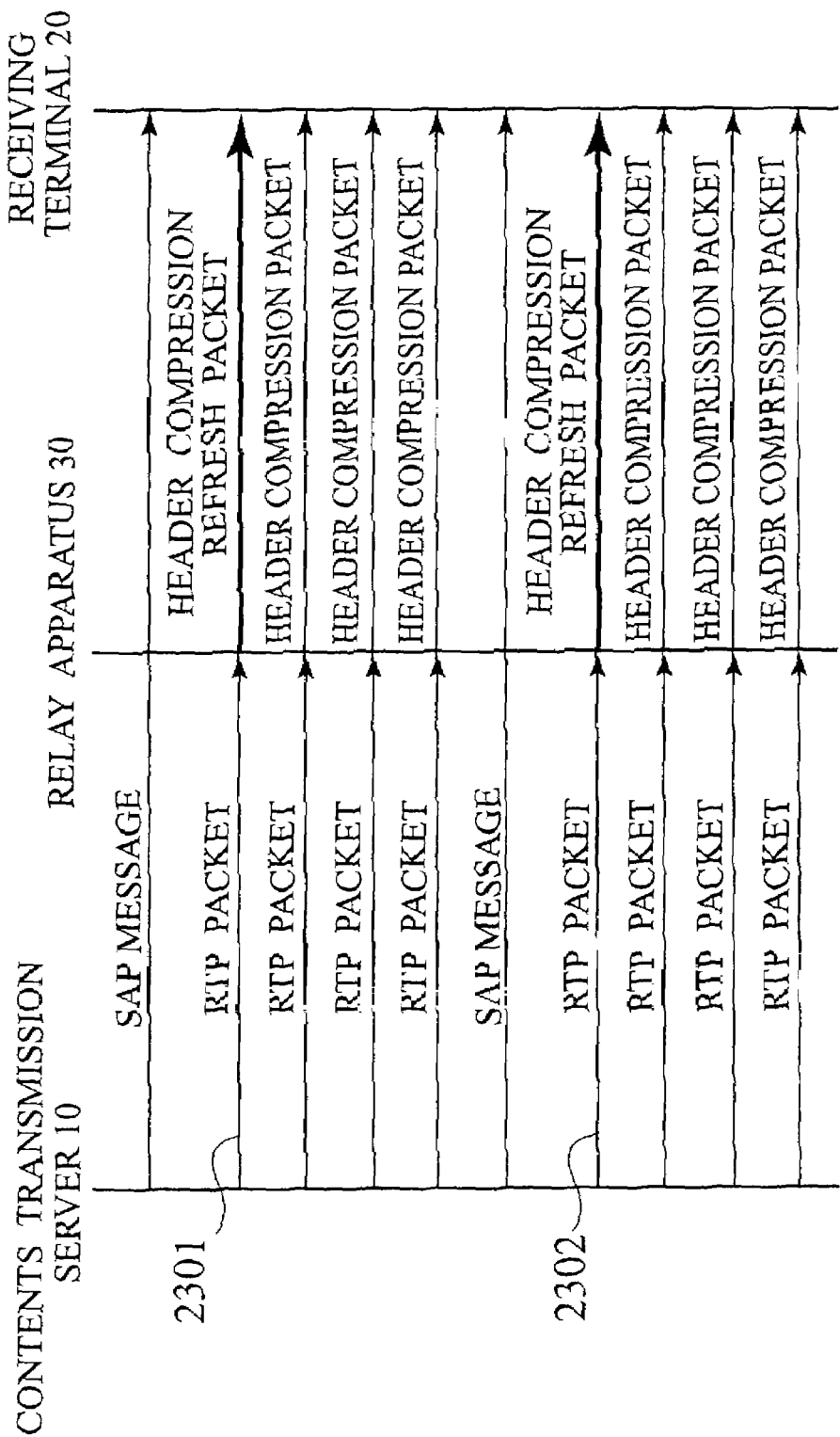
FIG. 23 is a sequence diagram of a broadcast communication system according to one embodiment of the present invention.

In the sixth embodiment of the present invention, a description will be made by use of FIG. 1 and FIGS. 23 to 26 for an example of performing header compression of a "RTP/UDP/IP" packet in a packet-based broadcast communication system. FIG. 23 is a sequence diagram showing an operation of the contents transmission server 10 transmitting the repeatedly transmitted SAP message and a header compression packet to the receiving terminal 20 via the relay apparatus 30.

In the packet-based broadcast communication system in this embodiment, the broadcast media, such as the audio information, the video information and the like, is transmitted as a RTP packet. A "RTP/UDP/IP header" as a header is added to the RTP packet, and thus the overhead thereof is extremely large.

In this embodiment, as shown in FIG. 23, the RTP packets are transmitted without compressing the RTP/UDP/IP header between the contents transmission server 10 and the relay apparatus 30.

The relay apparatus 30 transmits the RTP packets (the RTP packets transmitted in Steps 2301 and 2302 in FIG. 23), which are received from the contents transmission server 10 immediately after the SAP message, to the receiving terminal 20 as header compression refresh packets.

On the other hand, the relay apparatus 30 transmits the other RTP packets received from the contents transmission server 10 (the RTP packets transmitted in Steps 2304 and 2305 in FIG. 23) to the receiving terminal 20 as header compression packets.

Specifically, in FIG. 23, the relay apparatus 30 relays at least one broadcast media, first received after the broadcast notification information (SAP message), is received from the contents transmission server 10 (the RTP packet transmitted in Steps 2301 and 2302) to the receiving terminal 20 in a format reproducible without referring to the other broadcast media (as the header compression refresh packet).

In such a manner, when the header compression processing is applied between the relay apparatus 30 and the receiving terminal 20 in the packet-based broadcast communication system, the following problem is resolved. That being the problem of the receiving terminal 20 that starts to see and hear the broadcast of the broadcast media from a halfway thereof, being unable to recover the RTP packet, because the RTP packet transmitted immediately after receiving the SAP message is the header compression packet and thus the header compression state thereof is unclear.

Note that the case of performing the header compression for the RTP packet (RTP/UDP/IP header) was described herein. However, the header compression may be performed for a UDP packet (UDP/IP header) or an IP packet (IP header).

Figure 24:
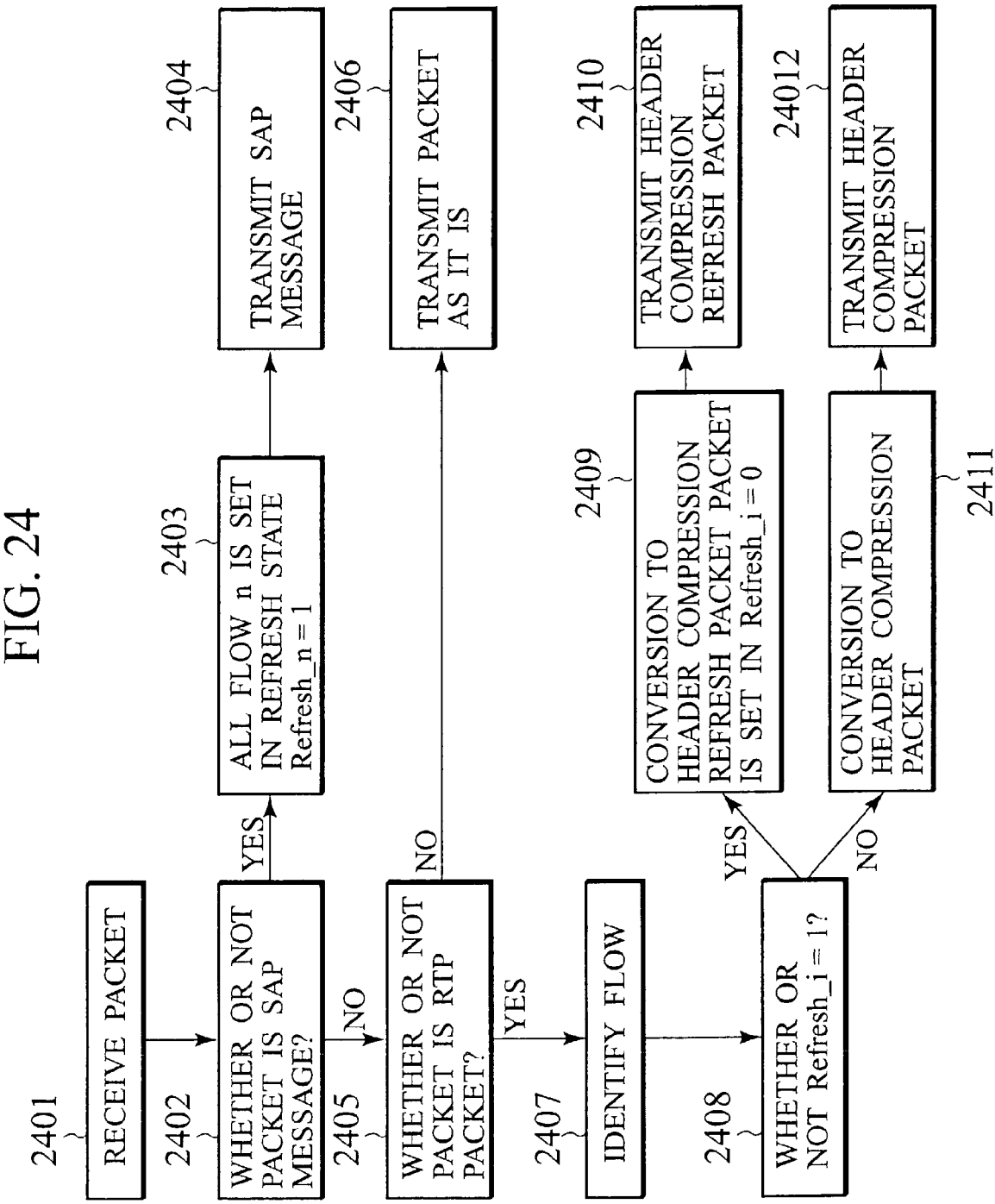
FIG. 24 is a flowchart illustrating an operation of a relay apparatus according to the one embodiment of the present invention.

Next, by use of FIG. 24, a specific example of the header compression processing in the relay apparatus 30 shown in FIG. 23 will be described. FIG. 24 is a flowchart illustrating the header compression processing in the relay apparatus 30.

As shown in FIG. 24, the relay apparatus 30 receives a packet from the contents transmission server 10 in Step 2401, and investigates whether or not the packet to be transmitted next is the SAP message in Step 2402.

When the packet is the SAP message, the relay apparatus 30 sets the "flow n" of the all RTP packets in a "refresh state (Refresh_n=1)" in Step 2403, and transmits the SAP message as it is to the receiving terminal 20 in Step 2404.

On the other hand, when the packet is not the SAP message, the relay apparatus 30 investigates whether or not the packet is the RTP packet in Step 2405. When the packet is not the RTP packet, the relay apparatus 30 transmits the packet as it is, to the receiving terminal 20 in Step 2406.

On the other hand, when the packet is the RTP packet, the relay apparatus 30 determines to which flow the RTP packet corresponds from the "IP address", "port number" and "SSRC identifier of RTP" of the RTP packet in Step 2407. It is assumed in this embodiment that the RTP packet is determined to be the "flow i".

In Step 2408, the relay apparatus 30 investigates whether or not the "flow i" is in a "refresh state (Refresh_i=1)". When the "flow i" is in the "refresh state (Refresh_i=1)", in Step 2409, the relay apparatus 30 converts the RTP packet into a header compression refresh packet and sets the "flow i" to a "non-refresh state (Refresh_i=0)". Then, in Step 2410, the relay apparatus 30 transmits the header compression refresh packet to the receiving terminal 20.

On the other hand, if the "flow i" is in the "non-refresh state (Refresh_i=0)", the relay apparatus 30 converts the RTP packet into the header compression packet in Step 2411 and transmits the header compression packet to the receiving terminal 20 in Step 2412.

Note that although the case of performing the header compression for the RTP packet (RTP/UDP/IP header) was described in this embodiment, the present invention is not limited thereto but is also applied to the case of performing the header compression for the UDP packet (UDP/IP header) or the IP packet (IP header).

Next, by use of FIGS. 25 and 26, a header compression method in which the contents transmission server 10 and the relay apparatus 30 are linked together will be described.

Figure 25:
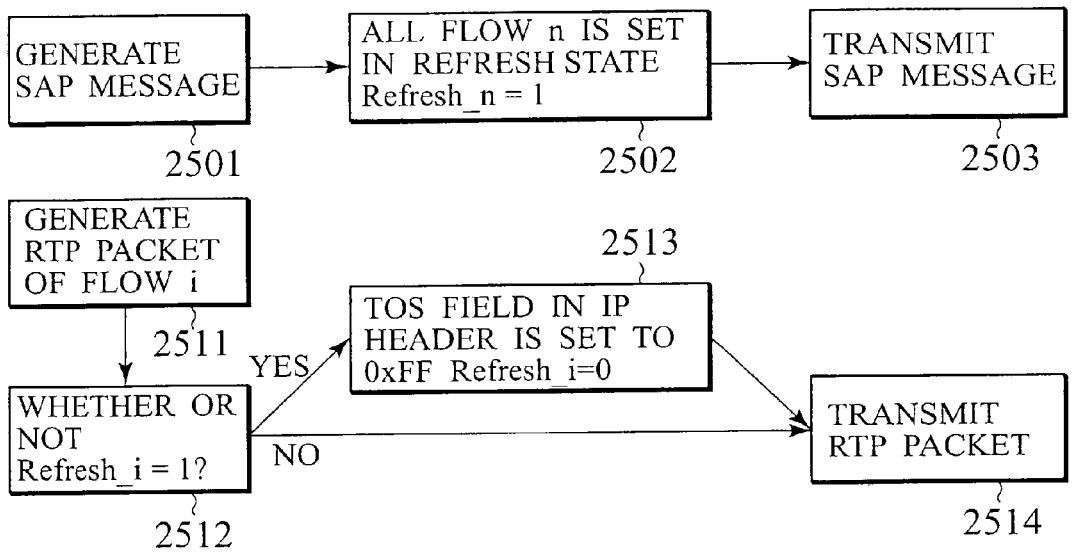
FIG. 25 is a flowchart illustrating an operation of the server according to the one embodiment of the present invention.

FIG. 25 is a flowchart illustrating an operation of adding information related to the header compression in the contents transmission server 10.

As shown in FIG. 25, the contents transmission server 10 generates a SAP message in Step 2501, sets the "flow n" of the all packets to the "refresh state (Refresh_n=1)" in Step 2502, and transmits the SAP message to the relay apparatus 30 in Step 2503.

Moreover, the contents transmission server 10 generates a RTP packet of the "flow i" in Step 2511 and determines whether or not the "flow i" is in the "refresh state (Refresh_i=1)" in Step 2512.

When the "flow i" is in the "refresh state (Refresh_i=1)", the contents transmission server 10 changes a "TOS (Type of Service) field" in the IP header of the RTP packet into "0xFF" and sets the "flow i" to the "non-refresh state (Refresh_i=0)" in Step 2513, and transmits the RTP packet in which the "TOS field" is set to "0xFF" to the relay apparatus 30 in Step 2514.

On the other hand, when the "flow i" is in the "non-refresh state (Refresh_i=0)", the contents transmission server 10 transmits the RTP packet, in which the "TOS field" stays the same, to the relay apparatus 30 in Step 2514.

Figure 26:
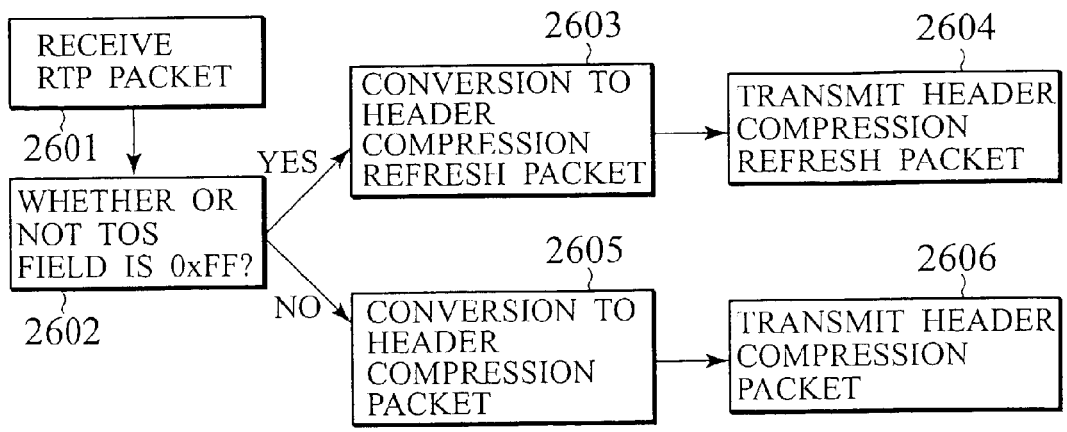
FIG. 26 is a flowchart illustrating an operation of a relay apparatus according to the one embodiment of the present invention.

FIG. 26 is a flowchart illustrating an operation in the relay apparatus 30 composed of the radio network controller 40 and the base station 50, the operation being related to the processing of packets received from the contents transmission server 10 described in FIG. 25.

As shown in FIG. 26, the relay apparatus 30 receives a RTP packet from the contents transmission server 10 in Step 2601 and investigates whether or not a "TOS field" of the RTP packet is "0xFF" in Step 2602.

When the "TOS field" of the RTP packet is "0xFF", the relay apparatus 30 converts the RTP packet into a header compression refresh packet in Step 2603 and transmits the header compression refresh packet to the receiving terminal 20 in Step 2604.

On the other hand, when the "TOS field" of the RTP packet is not "0xFF", the relay apparatus 30 converts the RTP packet into a header compression packet in Step 2605 and transmits the header compression packet to the receiving terminal 20 in Step 2606.

Specifically, in FIGS. 25 and 26, the contents transmission server 10 transmits the broadcast media (RTP packet) which is to be first transmitted after transmitting the broadcast notification information (SAP message) and identification information indicating an effect thereof (information related to the header compression) in association with each other. (In other words, the contents transmission server 10 transmits the RTP packet after setting the "TOS field" thereof to "0xFF".)

Moreover, when the relay apparatus 30 receives the broadcast media (the RTP packet of which "TOS field" is set to "0xFF") associated with the identification information indicating the effect that the broadcast media is first transmitted after transmitting the broadcast notification information (SAP message), the relay apparatus 30 relays the broadcast media (RTP packet) to the receiving terminal 20 in a format reproducible without referring to the other broadcast media (as the header compression refresh packet).

As a result, the RTP packet received immediately after the SAP message is transmitted as the header compression refresh packet, and the receiving terminal 20 can recover the RTP packet correctly.

Note that although the case of performing the header compression for the RTP packet (RTP/UDP/IP header) was described in this embodiment, the present invention is not limited thereto but is also applicable to the case of performing the header compression for the UDP packet (UDP/IP header) or the IP packet (IP header).

Note that, other than the "TOS field", the field changed by the contents transmission server 10 (that is, the field investigated by the relay apparatus 30) may be an "ID field" in the IP header, a "RTP marker bit" in the RTP header or the like. Specifically, it is satisfactory that the field is information that is decided between the contents transmission server 10 and the relay apparatus 30 and is commonly recognized thereby. Moreover, a value changed in the "TOS field" may be other than "0xFF".

Note that a method of utilizing a priority of the "TOS field" enables control of the number of repeated transmissions of data transmitted in the data carousel system according to priority, and enables the number of transmissions of data in the data carousel system with a higher priority, to be larger than that of the other data. Accordingly, important data can be transmitted to the receiving terminal 20 more surely.

Seventh Embodiment

Figure 29:
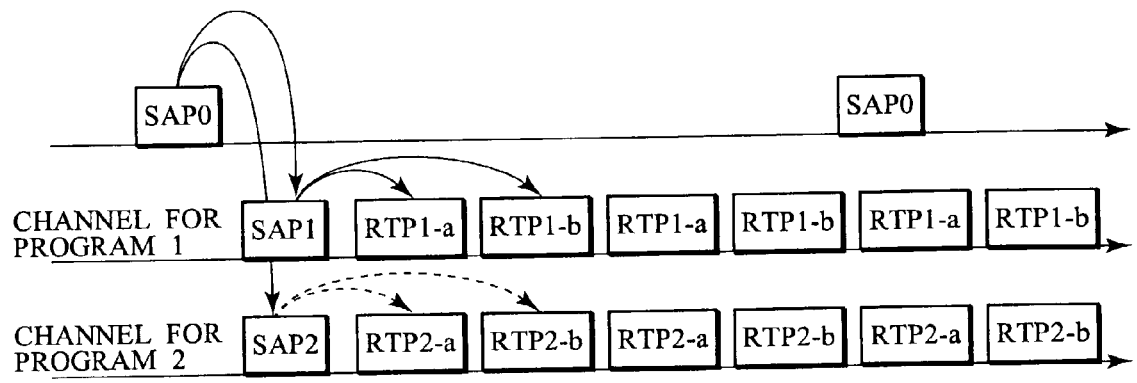
FIG. 29 is a diagram showing a state of transmitting a plurality of broadcast media in the broadcast communication system according to the one embodiment of the present invention.

In the seventh embodiment of the present invention, a description will be made with reference to FIGS. 27 to 29 for an example of the case where the contents transmission server 10 performs streaming delivery of the broadcast media via a plurality of wireless channels.

In the example of FIG. 27, the contents transmission server 10 transmits SAP messages (SAP1, SAP2) via a channel for SAP messages, transmits the first broadcast media (RTP1-a, RTP1-b) via a channel for program 1 and transmits the second broadcast media (RTP2-a, RTP2-b) via a channel for program 2. In other words, in the example of FIG. 27, the contents transmission server 10 uses wireless channels different for every program.

In this case, it is insufficient that the contents transmission server 10 designates only the IP address (logical channel identification information) of the broadcast media (program) in the SAP message. The contents transmission server 10 also needs to specify which broadcast media be aired on which wireless channel. Then, the contents transmission server 10 notifies information specifying the wireless channels (physical channel identification information) in the SDP information contained in the SAP message.

The contents transmission server 10, as shown in FIG. 28, notifies the information specifying the wireless channels thus, for example, "c=Channel ABCDE" in a "c field" of the SDP information. As the information specifying the wireless channels, a channelization code in a CDMA communication system, a frequency value and the like are conceivable.

The receiving terminal 20 specifies the wireless channel on which the broadcast media is aired based on the information specifying the wireless channels, thus enabling the broadcast media to be seen and heard.

Specifically, in this embodiment, the SDP information in the broadcast notification information (SAP message) includes correspondence information between the physical channel identification information to which the broadcast media is transmitted (the information specifying the wireless channels, such as the channelization code in the CDMA communication system, the frequency value and the like) and the logical channel identification information (the IP address of the broadcast media).

Note that, in this embodiment, the description was made for the case of broadcasting the SAP messages (SAP1, SAP2) according to the respective broadcast media via the channels for SAP message. However, as shown in FIG. 29, the SAP messages (SAP1, SAP2) corresponding to the respective wireless channels may be broadcasted via the respective channels for programs, and information (SAP0) associating the IP address (multicast address) of each broadcast media with the information specifying the wireless channels may be broadcasted on a common channel (the channel for SAP message).

Eighth Embodiment

Figure 30:
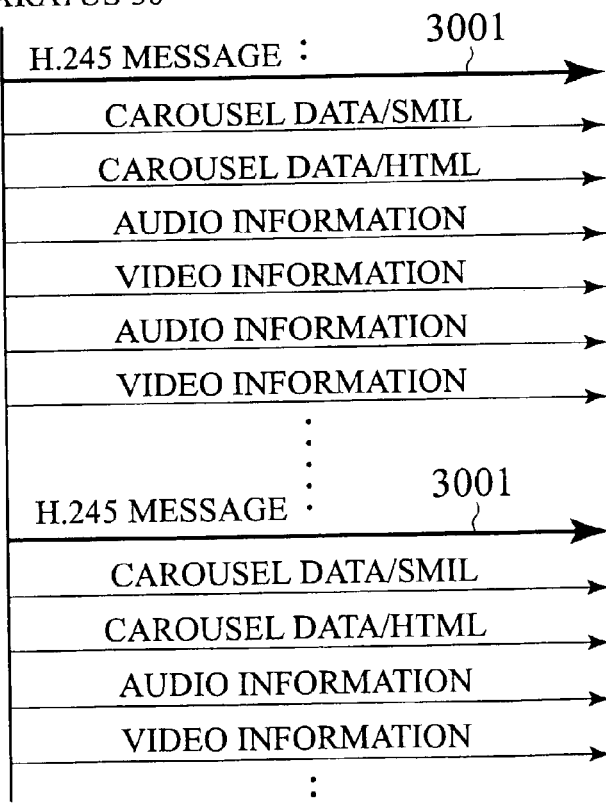
FIG. 30 is a sequence diagram of a broadcast communication system according to one embodiment of the present invention.

In the eighth embodiment of the present invention, a description will be made with reference to FIGS. 5 to 9 and FIGS. 30 to 33 for an example of broadcasting the broadcast media by use of a H.223 multiplexed frame system. Hereinafter, the H.223 multiplexed frame system will be referred to as a circuit-switching broadcast communication system. FIG. 30 is a schematic view of a broadcast communication sequence in the circuit-switching broadcast communication system. Here, it is assumed that the contents transmission server 10 knows the level of a H.223 multiplexed frame, receiving and demultiplexing capabilities of the receiving terminal 20 and that the receiving terminal 20 is a "Slave terminal".

As shown in FIG. 30, in Step 3001, by receiving a "H.245 message" that is the broadcast notification information, the receiving terminal 20 detects "logical channel information of the broadcast media (logical channel parameter)" and the "H.223 multiplex table".

Thereafter, the relay apparatus 30 transmits audio information, video information and carousel data in accordance with the H.223 multiplexed frame described in the H.245 message.

Figure 31:
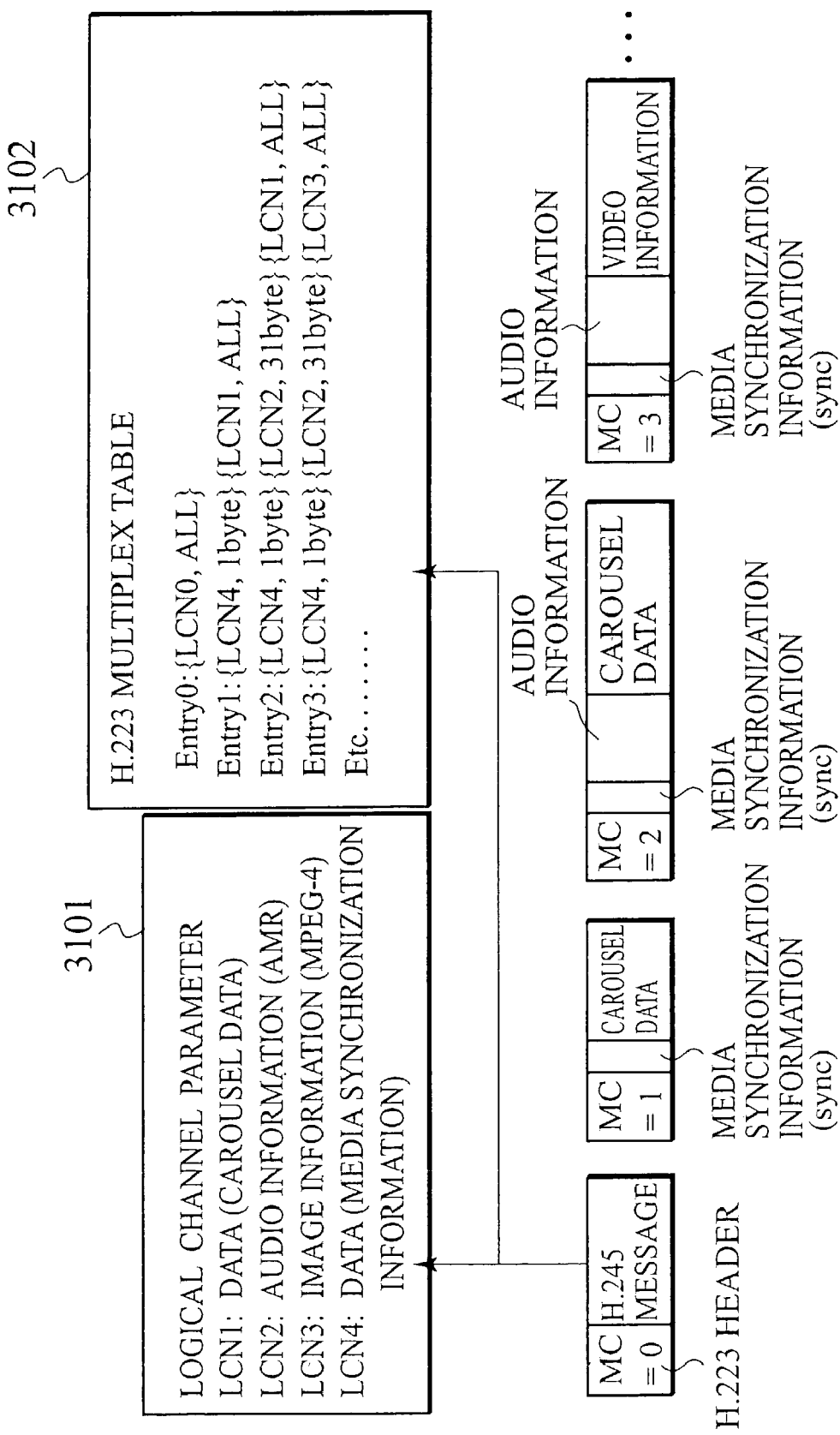
FIG. 31 is a diagram illustrating a structure of a H.223 multiplexed frame for use in the broadcast communication system according to the one embodiment of the present invention.

FIG. 31 is a transmission example of the H.223 multiplexed frame in the circuit-switching broadcast communication system. As shown in FIG. 31, the H.245 message includes the logical channel parameter 3101 and the H.223 multiplex table 3102.

In this embodiment, the logical channel parameter 3101 indicates that the carousel data is transmitted in the first logical channel (LCN1), the audio information (AMR) is transmitted in the second logical channel (LCN2), the video information (MPEG-4) is transmitted in the third logical channel (LCN3) and the media synchronization information is transmitted in the fourth logical channel (LCN4).

According to the description {LCN0, ALL} of the H.223 multiplex table 3102 shown in FIG. 31, the H.223 multiplexed frame 0 (Entry0) is entirely composed of the logical channel LCN0.

According to the description {LCN4, 1byte}{LCN1, ALL} of the H.223 multiplex table 3102 shown in FIG. 31, in the H.223 multiplexed frame 1 (Entry1), 1 byte thereof is composed of the fourth logical channel (LCN4) and the rest thereof is composed of the first logical channel (LCN1).

According to the description {LCN4, 1byte}{LCN2, 31byte}{LCN1, ALL} of the H.223 multiplex table 3102 shown in FIG. 31, in the H.223 multiplexed frame 2 (Entry2), 1 byte thereof is composed of the fourth logical channel (LCN4), 31 bytes thereof are composed of the second logical channel (LCN2) and the rest thereof is composed of the first logical channel (LCN1).

The constitution of the H.223 multiplexed frame 3 (Entry3) and the like can be also understood similarly below.

In the example of the H.223 multiplexed frame shown in FIG. 31, it is indicated that the H.245 message (MC=0) is first transmitted, and then the H.223 multiplexed frame 1 (Entry1) in which the media synchronization information (LCN4) and the carousel data (LCN1) are multiplexed is transmitted.

Figure 32:
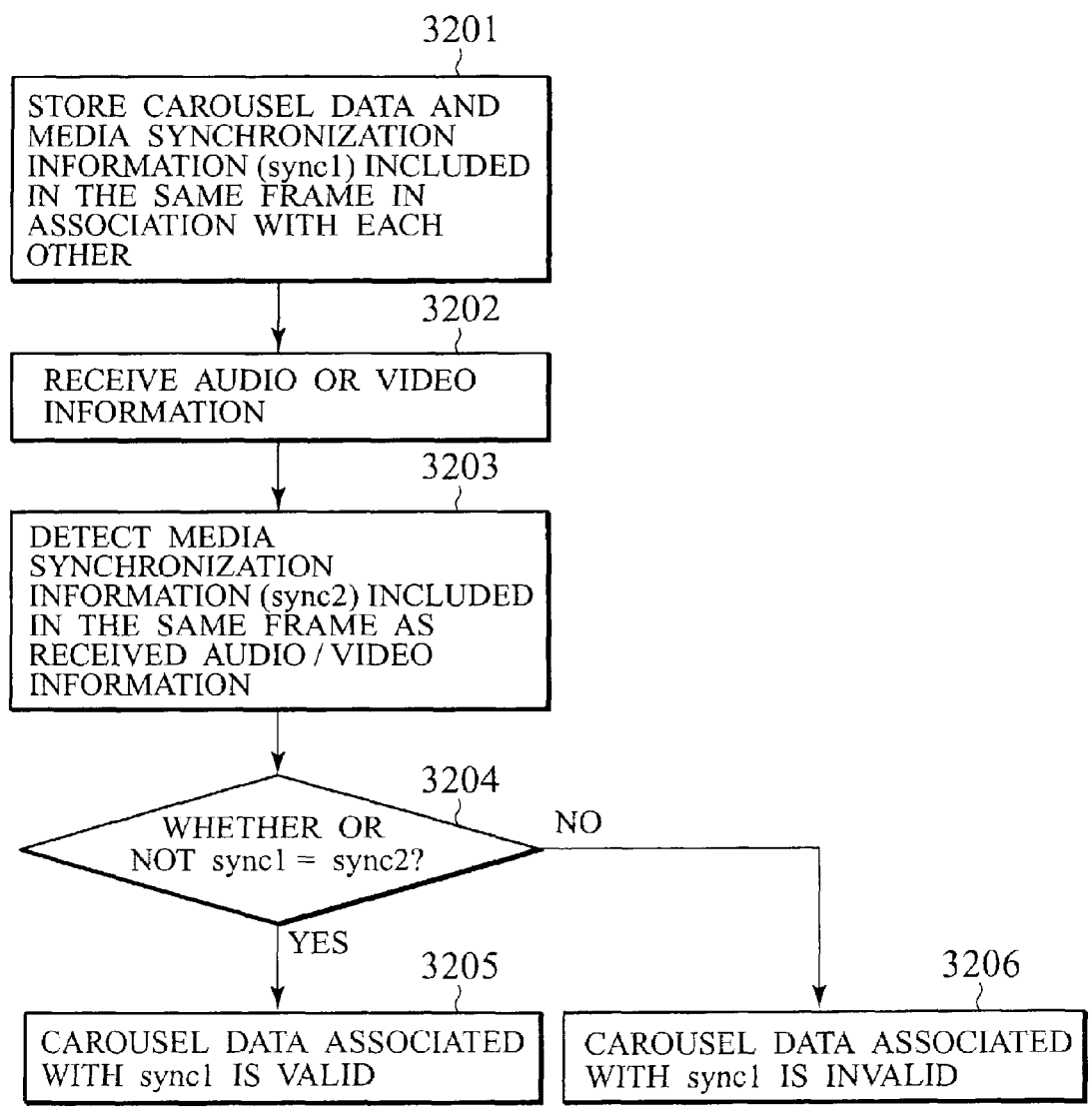
FIG. 32 is a flowchart illustrating an operation of a communication terminal according to the one embodiment of the present invention.

FIG. 32 is a flowchart illustrating an operation of synchronizing the carousel data and the audio and video information transmitted by the above-described H.223 multiplexed frame in the receiving terminal 20.

As shown in FIG. 32, in Step 3201, the receiving terminal 20 stores the carousel data received by the H.223 multiplexed frame and the media synchronization information (sync1) included in the H.223 multiplexed frame in association with each other.

The receiving terminal 20 receives the audio information or the video information from the H.223 multiplexed frame in Step 3202 and detects the media synchronization information (sync2) included in the H.223 multiplexed frame in Step 3203.

In Step 3204, the receiving terminal 20 determines whether or not the media synchronization information (sync1), stored when receiving the carousel data, coincides with the media synchronization information (sync2).

When the "sync1" and the "sync2" coincide with each other, in Step 3205, the receiving terminal 20 determines that the carousel data associated with the "sync1" is valid, and the carousel data is processed in synchronization with reproduction of the audio information or the video information.

When the "sync1" and the "sync2" do not coincide with each other, in Step 3206, the receiving terminal 20 determines that the carousel data associated with the "sync1" is invalid.

Here, specifications of the carousel data are the same as those of the carousel data shown in FIGS. 5 to 7. Moreover, text information, anchor information and the like in the carousel data are the same as those shown in FIGS. 9 and 10, respectively.

FIG. 33 is a description example of the "SMIL" in this embodiment. The "SMIL" according to this embodiment indicates one piece of audio information, one piece of video information, two pieces of text information, layout information and timing synchronization information (timing information).

Here, the "LCN2" represents the second logical channel (LCN2) and is the audio information as described in FIG. 31. The "LCN3" represents the third logical channel (LCN3) and is the video information as described in FIG. 31. The "~/module01" denotes a module (module01) specified in the first logical channel (LCN1). Here, the module01 is the text information (telop). The "~/module02" denotes a module (module02) specified in the first logical channel (LCN1). Here, the module02 is the anchor information (URL).

Note that the "SMIL" shown in FIG. 33 is a module (module00) specified in the first logical channel (LCN1). The first logical channel (LCN1) is the carousel data as described in FIG. 31.

According to this embodiment, when there is something missing in the transmitted H.223 multiplexed frame, the synchronization reproduction processing, which is not intended by the data (carousel data) transmitted in the data carousel system and by the audio and video information, will never be performed.

In this embodiment, as described above, the contents transmission server 10 periodically and repeatedly transmits the H.245 message which is the broadcast notification information, and repeatedly transmits the carousel data after transmitting the H.245 message.

Moreover, the contents transmission server 10 transmits the reproduction information indicating the reproduction method of the broadcast media by means of the logical channel parameter and H.223 multiplex table of the H.245 message and the "SMIL" which is the carousel data.

Ninth Embodiment

In the ninth embodiment of the present invention, a description will be made for an example of setting a video information message (after transmitting the H.245 message as the broadcast notification information) to be an I picture frame. In this embodiment, the "SAP message" described in the foregoing fifth embodiment is changed into the "H.245 message" and then applied to the circuit-switching broadcast communication system.

FIG. 34 is a sequence diagram showing an operation of broadcasting data (H.245 message and video information) by the contents transmission server 10.

In the circuit-switching broadcast communication system, the contents transmission server 10 repeatedly transmits the H.245 message. The receiving terminal 20 cannot receive the broadcast media such as the audio information, the video information and the like until the receiving terminal 20 receives the H.245 message.

Here, when the broadcast media is the video information, since the receiving terminal 20 needs a dependency relation between video information frames for decoding the video information frames, the receiving terminal 20 cannot always decode the video information frames correctly immediately after starting to receive the broadcast media.

When MPEG coding is assumed, for example, the I picture frame can be decoded by itself. However, the P picture frame is difference information from the previous video information frame. Therefore the previous video information frame which has been decoded correctly is needed in order to decode the P picture frame.

Accordingly, even if the receiving terminal 20 receives the broadcast media composed of the P picture frame immediately after receiving the H.245 message, the receiving terminal 20 cannot immediately decode the video information and has to wait until the next I picture frame is transmitted.

In order to reduce such a waiting time, the contents transmission server 10 always transmits the video information packet composed of the I picture frame first after transmitting the H.245 message.

In the case of real-time coding, when detecting the transmission of the H.245 message, the contents transmission server 10 converts the video information frame to be coded immediately thereafter into the I picture frame.

Whilst the video information is being generated, the contents transmission server 10 codes the I picture frame by making an appearance cycle of the I picture frame in the coding of the video information equivalent to a repetition cycle of the H.245 message. As a result, the receiving terminal 20 can receive the I picture frame as the video information obtained immediately after receiving the H.245 message and can decode the I picture frame. Thus, the waiting time until the video information is displayed can be shortened.

Tenth Embodiment

In the tenth embodiment of the present invention, with reference to FIG. 1, FIG. 8, FIG. 33 and FIGS. 35 to 38, a description will be made for an example of performing transmission protocol conversion in the relay apparatus 30 relaying the broadcast media when the broadcast media is transmitted from the contents transmission server 10 to the receiving terminal 20.

To be specific, an example will be shown, in which the relay apparatus 30 converts the broadcast media transmitted from the contents transmission server 10 by the IP packet into broadcast media transmittable by a protocol for circuit-switching broadcast communication based on the H.223 multiplexed frame system, and transmits the converted broadcast media to the receiving terminal 20.

FIG. 35 is a constitutional view showing a protocol stack of an IP packet-based broadcast communication system between the contents transmission server 10 and the relay apparatus 30 in this embodiment.

The broadcast media of the audio information (Speech coding, Audio coding) 3502 and 3503 and the video information (Video coding) 3501 are transmitted by the "RTP(3510)/UDP(3511)/IP(3512) packet" of a streaming format.

The carousel data 3504 is transmitted by the "UDP(3511)/IP(3512) packet". The data transmitted by the carousel data 3504 include the still-image information (Image coding) 3505, the text information (Text description) 3506 and the layout information and time synchronization information (Layout & Sync description) 3508. The SAP message 3507 notifying the broadcast notification information (Session Announcement) 3509 is transmitted by the "UDP(3511)/IP (3512) packet".

Figure 36:
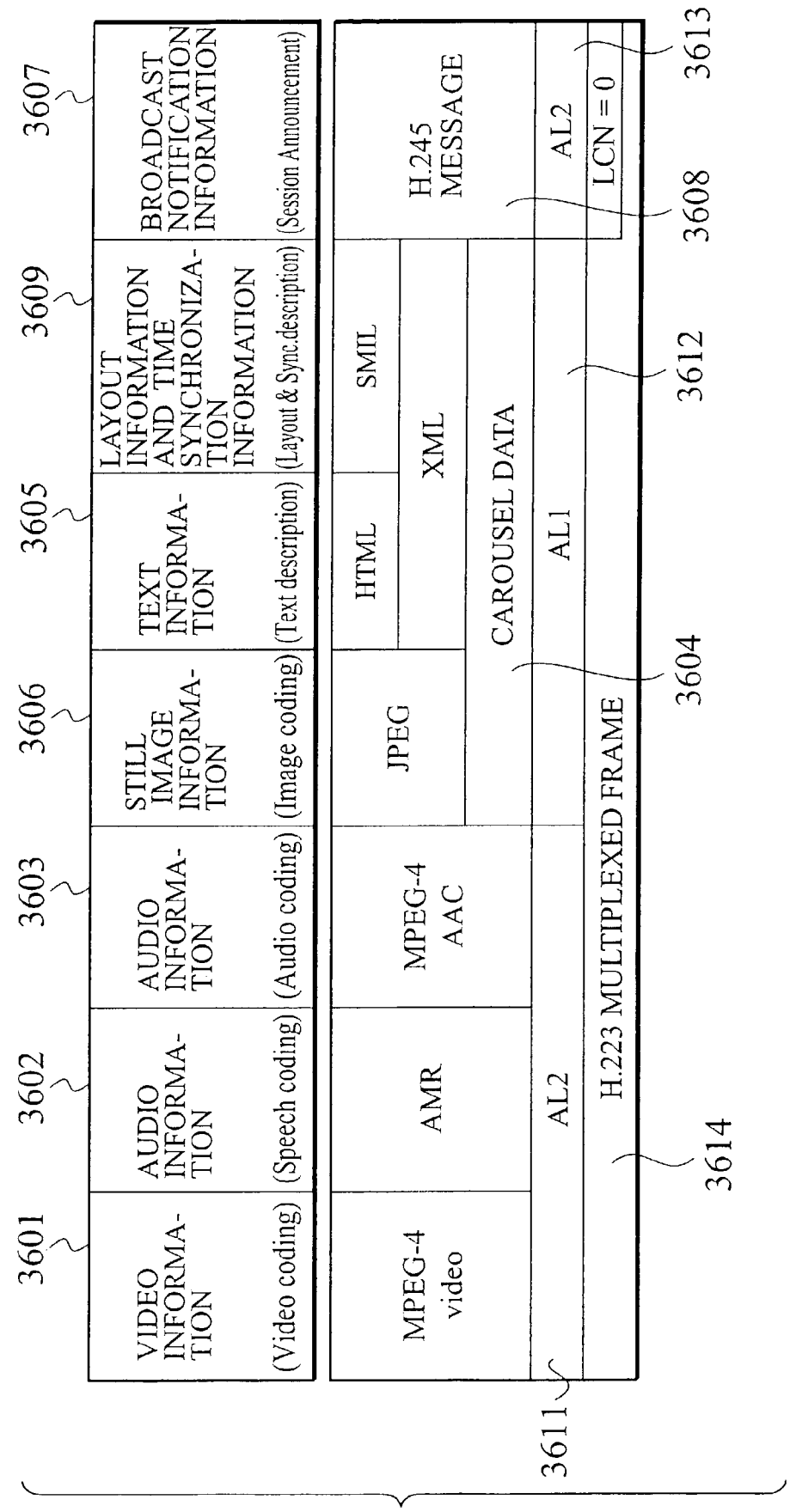
FIG. 36 is a diagram illustrating a protocol stack for use in a broadcast communication system according to the one embodiment of the present invention.

FIG. 36 is a constitutional view showing a protocol stack of the circuit-switching broadcast communication system between the relay apparatus 30 and the receiving terminal 20 in this embodiment.

Each broadcast media is transmitted by the H.223 multiplexed frame 3614. The audio information 3602 and 3603 and the video information 3601 are transmitted by AL2 (3611) on the H.223 multiplexed frame.

The carousel data (3604) is transmitted by AL1 (3612) on the H.223 multiplexed frame. The data transmitted by the carousel data 3604 include the still-image information (Image coding) 3606, the text information (Text description) 3605 and the layout information and time synchronization information (Layout & Sync description) 3609. The broadcast notification information (Session Announcement) 3607 related to the broadcast media and the transmission system is transmitted by the H.245 message 3608 on AL2 (3613). Note that the H.245 message is included in the logical channel 0 (LCN=0).

Figure 37:
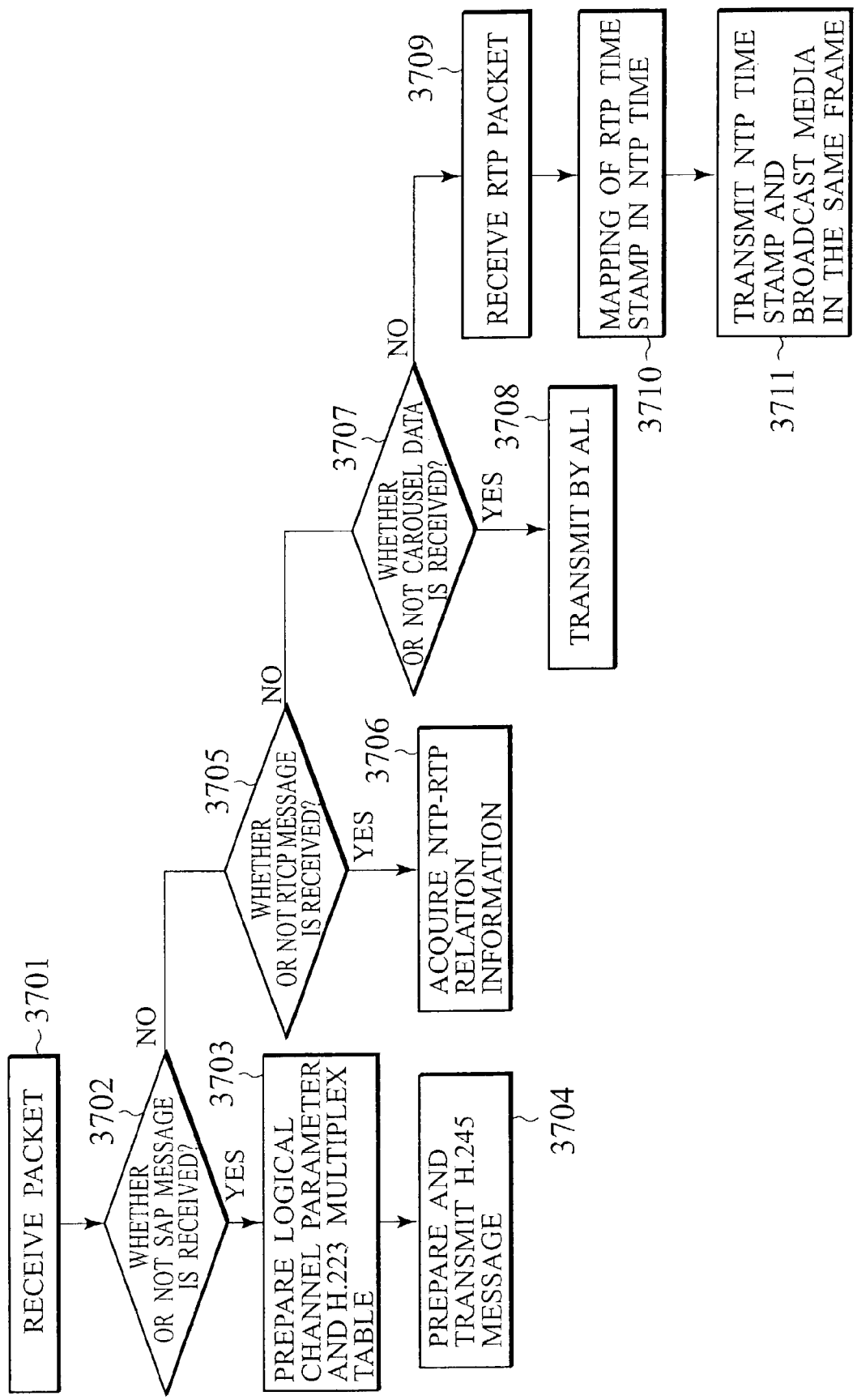
FIG. 37 is a flowchart illustrating an operation of a relay apparatus according to the one embodiment of the present invention.

With reference to FIG. 37, a description will be made for operation specifications for performing protocol conversion from the packet-based broadcast communication system to the circuit-switching broadcast communication system.

As shown in FIG. 37, the relay apparatus 30 receives a packet from the contents transmission server 10 in Step 3701, and determines whether or not the received packet is a SAP message in Step 3702.

When the received packet is the SAP message, the relay apparatus 30 prepares a logical channel parameter and a H.223 multiplex table based on the description (SDP information) related to the broadcast media in the SAP message in Step 3703, and generates a H.245 message to be transmitted to the receiving terminal 20 in Step 3704.

Moreover, when the received packet is not the SAP message, the relay apparatus 30 determines whether or not the received packet is a RTCP message in Step 3705.

When the received packet is the RTCP message, in Step 3706, the relay apparatus 30 acquires and stores information associating a NTP time stamp and a RTP time stamp, which are included in the RTCP message, with each other.

Moreover, when the received packet is not the RTCP message, in Step 3707, the relay apparatus 30 determines whether or not the received packet is carousel data.

When the received packet is the carousel data, in Step 3708, the relay apparatus 30 transmits the carousel data to the receiving terminal 20 by AL1 (3612 of FIG. 36) in the H.223 multiplexed frame.

Furthermore, when the received packet is not the carousel data, the relay apparatus 30 determines that the received packet is the RTP packet in Step 3709, and performs mapping of the NTP time stamp in each broadcast media received by the RTP packet based on a correspondence relation between the RTP time stamp and the NTP time stamp, which are associated with each other upon reception of the RTCP message, in Step 3710.

In Step 3711, the relay apparatus 30 transmits the NTP time stamp and any audio information and video information, which correspond to the NTP time stamp, within the same frame as the H.223 multiplexed frame.

Figure 38:
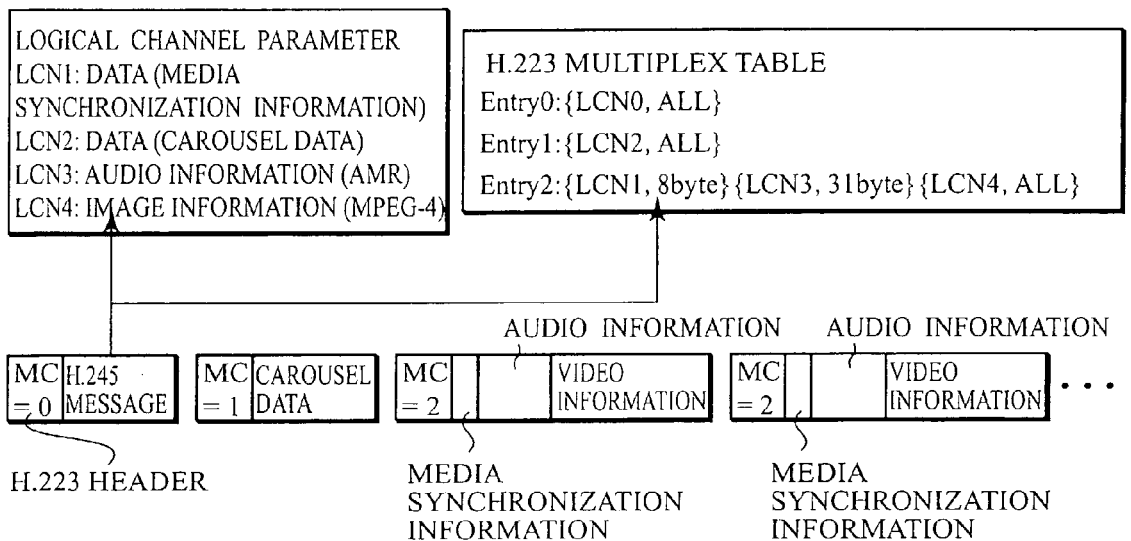
FIG. 38 is a diagram showing a structure of a H.223 multiplexed frame for use in a broadcast communication system according to the one embodiment of the present invention.

FIG. 38 shows one example of the logical channel parameter, the H.223 multiplex table and the H.223 multiplexed frame, which are generated when the relay apparatus 30 receives the broadcast media described in the first embodiment.

The relay apparatus 30 that has received the SAP message shown in FIG. 4 acquires information related to each of the transmitted broadcast media, prepares the logical channel parameter and the H.223 multiplex table, and transmits the H.245 message to the receiving terminal 20. When receiving carousel data, the relay apparatus 30 transmits the carousel data to the receiving terminal 20 by the H.223 multiplexed frame 1 (MC=1).

Note that, in this embodiment, there is no change in the constitution of the carousel data shown in FIGS. 5 to 8. However, a change in a data size when the "SMIL" is changed may occur.

Moreover, in this embodiment, the "SMIL" shown in FIG. 8 is converted into the "SMIL" shown in FIG. 33. Specifically, the "port number: 3456" for receiving the RTP message corresponding to the audio information is changed to the "logical channel: LCN2", and the "port number: 2232" for receiving the RTP message corresponding to the video information is changed to the "logical channel: LCN3".

Thereafter, taking the NTP time stamp as a reference, the relay apparatus 30 that has received the RTP packet including the audio and video information transmits the RTP packet to the receiving terminal 20 by the H.223 multiplexed frame 2 (MC=2). Here, the media synchronization information is assumed to be the NTP time stamp.

Note that, based on a radio condition in a radio section, a weighted coefficient and the like, the relay apparatus 30 can change the number of repeated transmissions of the data transmitted by the carousel data system.

Moreover, in order to shorten the repetition cycle of the H.245 message, the relay apparatus 30 can generate a plurality of H.245 messages for one SAP message received, and can transmit the generated H.245 messages repeatedly to the receiving terminal 20. On the contrary, when there is no change in the received SAP message, the H.245 messages to be transmitted can be thinned out.

Eleventh Embodiment

The eleventh embodiment of the present invention will be described with reference to FIGS. 1, 39 and 40. In this embodiment, when the relay apparatus 30 converts the data transmitted from the contents transmission server 10 by the IP packet into data transmittable by a circuit-switching-type protocol and broadcasts the converted data to the receiving terminal 20, the relay apparatus 30 transmits a plurality of SAP messages corresponding to a plurality of broadcast media.

The first method of realizing this embodiment broadcasts a plurality of broadcast media by a plurality of wireless channels by means of allocating the SAP messages to the wireless channels (physical channels) respectively, by the relay apparatus 30. The first method is an adaptable method when a plurality of physical channels exist.

The second method of realizing this embodiment broadcasts a plurality of broadcast media by one wireless channel (physical channel).

Figure 39:
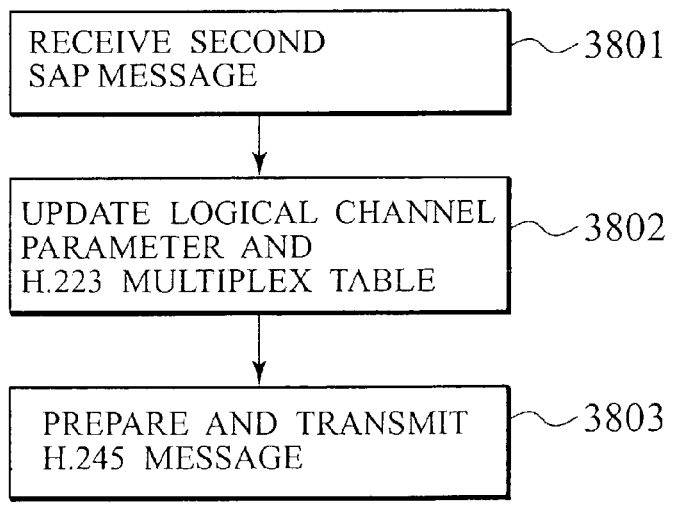
FIG. 39 is a flowchart illustrating an operation of a relay apparatus according to one embodiment of the present invention.

FIG. 39 is a flowchart illustrating an operation of the relay apparatus 30 in the case of broadcasting a different broadcast media simultaneously when the broadcast media described in the tenth embodiment is broadcasted. Here, it is assumed that the broadcast media shown in FIG. 38 has already been broadcasted.

As shown in FIG. 39, in Step 3801, the relay apparatus 30 receives the second SAP message which can be identified to be different from the first SAP message related to the first broadcast media currently broadcasted from the contents transmission server 10.

In Step 3802, the relay apparatus 30 acquires the contents of the second SAP message, stores the contents together with the contents of the first SAP message that has already been stored, and updates the logical channel parameter and the H.223 multiplex table.

In Step 3803, the relay apparatus 30 generates a new H.245 message and transmits the same to the receiving terminal 20.

Figure 40:
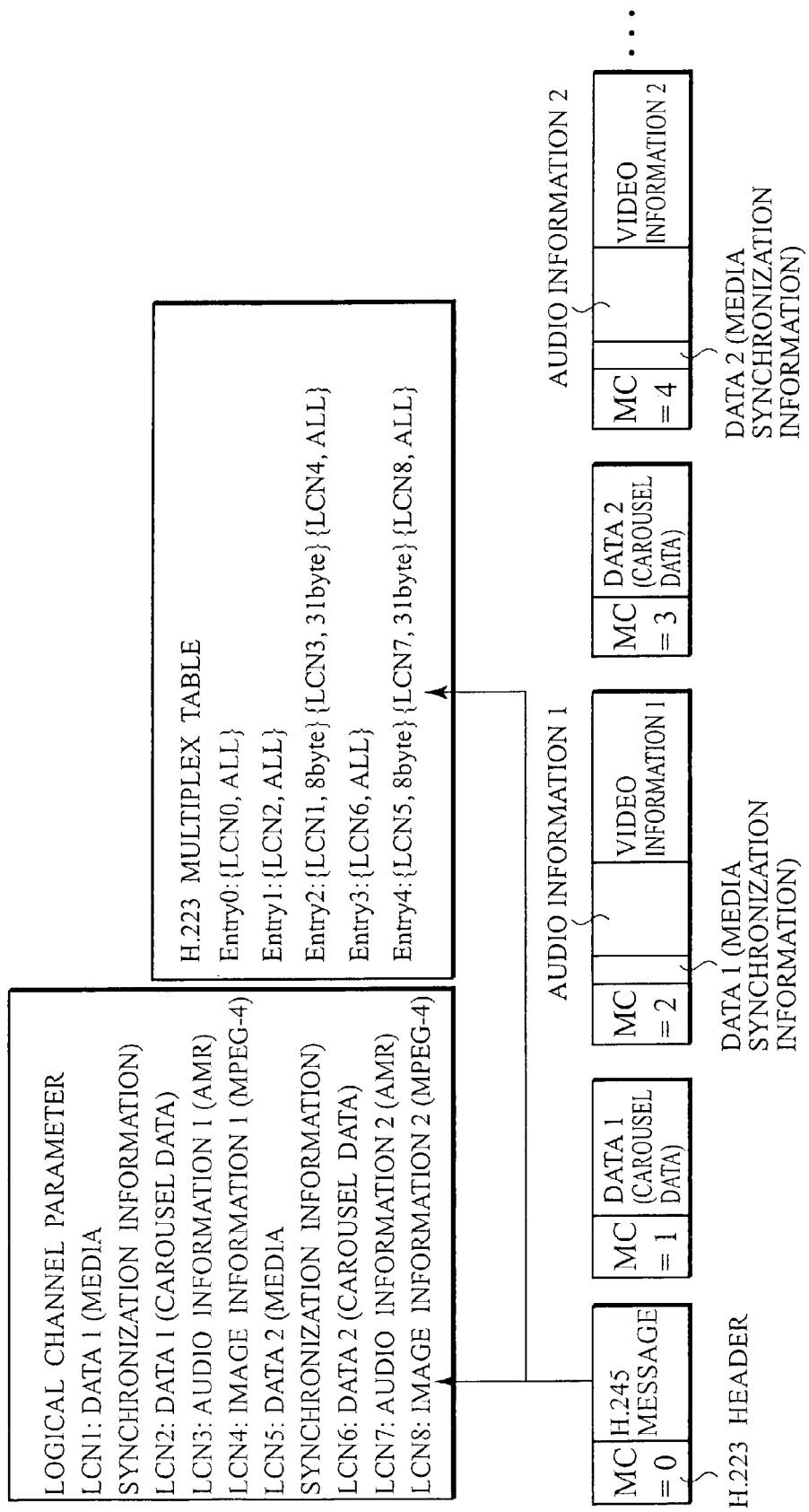
FIG. 40 is a diagram showing a structure of a H.223 multiplexed frame for use in the broadcast communication system according to the one embodiment of the present invention.

In FIG. 40, the logical channel parameter of the updated H.245 message, the H.223 multiplex table and the H.223 multiplexed frame transmitted by the receiving terminal 20 are shown.

In the logical channel parameter, the information related to the second broadcast media (LCN5 to LCN 8) is added to the information related to the first broadcast media shown in FIG. 38 (LCN1 to LCN4). Moreover, as to the H.223 multiplex table, the information related to the second broadcast media is added to the information related to the first broadcast media.

Note that this example is shown in FIGS. 38 and 40, in which the H.223 multiplexed frames are transmitted in the order of MC=1, MC=2, MC=3 and MC=4. However, the H.223 multiplexed frames are not necessarily transmitted in this order. Moreover, a plurality of contents transmission servers 10 may exist.

Twelfth Embodiment

The twelfth embodiment of the present invention will be described with reference to FIGS. 41 to 43. A broadcast communication system according to this embodiment enables synchronization reproduction of the broadcast media by use of "media identification information (mid)" included in the broadcast notification information (SAP message).

FIG. 41 is an example of "payload" contents in the SAP message. Here, the media identification information (mid) is designated for the respective broadcast media (audio information, video information, "SMIL", still-image information, text information and the like).

In the example of FIG. 41, the audio information (m=audio) is designated by the description of "a=mid: 1", and the video information (m=video) is designated by the description of "a=mid: 2".

Moreover, the "SMIL" is transmitted as the broadcast media designated by "a=mid: 3". Here, the description of "a=rtpmap:100 X-dc/8000"indicates that a codec type is "X-dc", that the data relating to the "SMIL" is carousel data and that a clock frequency is "8000". Moreover, the line of "a=fmtp" indicated that "content-type" is "SMIL" in a MIME system.

Similarly, it is indicated in FIG. 41 that the still-image information (JPEG) is transmitted as the broadcast media designated by "a=mid: 4", and the text information (HTML) is transmitted as the broadcast media designated by "a=mid: 5".

FIG. 42 shows an example of the "SMIL" used in the broadcast communication system according to this embodiment. Here, the description of "audio src="mid=1"" links the "SMIL" with the broadcast media designated by "mid: 1" in the SAP message (the audio information in the example of FIG. 41).

Similarly, the "SMIL" links with, the video information (mid: 2), the still-image information (mid: 4) and the text information (mid: 5), respectively.

As described above, in this embodiment, in the "SMIL", the broadcast media is referred to by the media identification information "mid"in the SAP message. As a result, the reproduction information of the broadcast media can be acquired from the SAP message.

Figure 43:
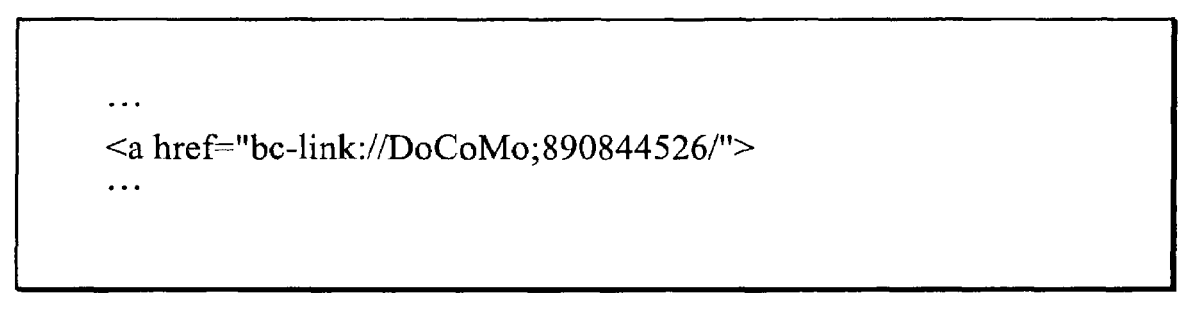

FIG. 43 shows an example of link information included in the text information (HTML) designated by "mid: 5". Here, the description of "<a href=" bc-link://<<USER_NAME>>; <<SESSION_ID>>">" designates the broadcast notification information (SAP message) corresponding to a "user name ("DoCoMo" in the example of FIG. 41)" and a "session ID", which is indicated by an "o field" in the broadcast notification information (SAP message).

When the user designates the above user name and the session ID, the receiving terminal 20 of the user reproduces the broadcast media corresponding to the SAP message designated by the user name and the session ID.

The description of "<a href=" bc-link:// <<USER-_NAME>>;<<SESSION_ID>>/">" shown in FIG. 43 uniquely specifies the SAP message shown in FIG. 41 and designates the broadcast media corresponding to the SAP message.

According to the broadcast communication system of this embodiment, the broadcast notification information (SAP message) can be specified, thus switching to broadcast of the other broadcast media (jumping to program contents offered by the other broadcast media) is made possible.

(Others)

Moreover, although the contents transmission server 10 and the relay apparatus 30 have been described as different constituent components in the entire embodiments described in this specification, the relay apparatus 30 may have the function of the contents transmission server 10.

Figure 44:
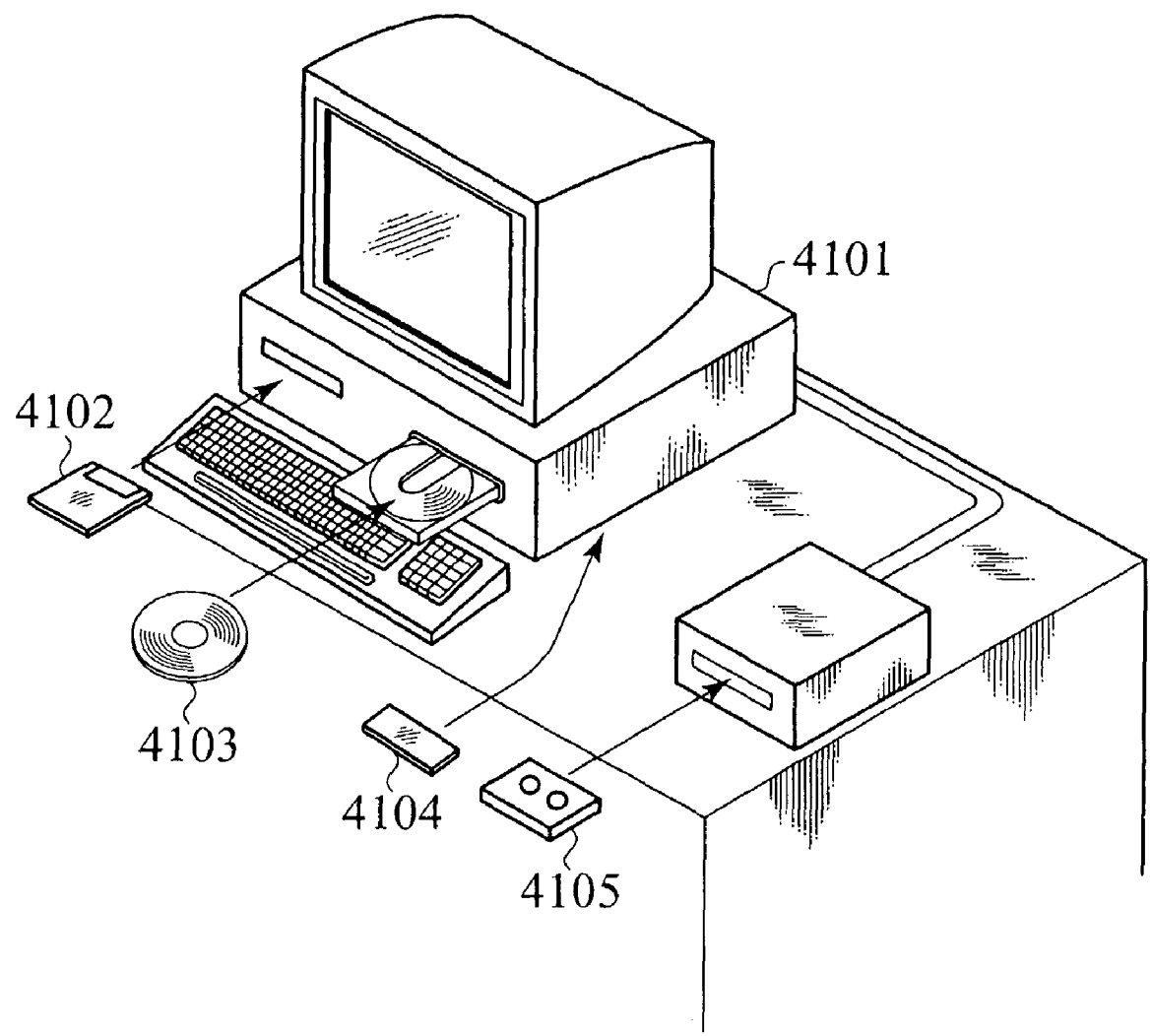
FIG. 44 is a diagram illustrating a computer-readable recording medium for recording a program for executing functions of a server, a relay apparatus and a mobile communication terminal according to one embodiment of the present invention.
Figures 45, 46:
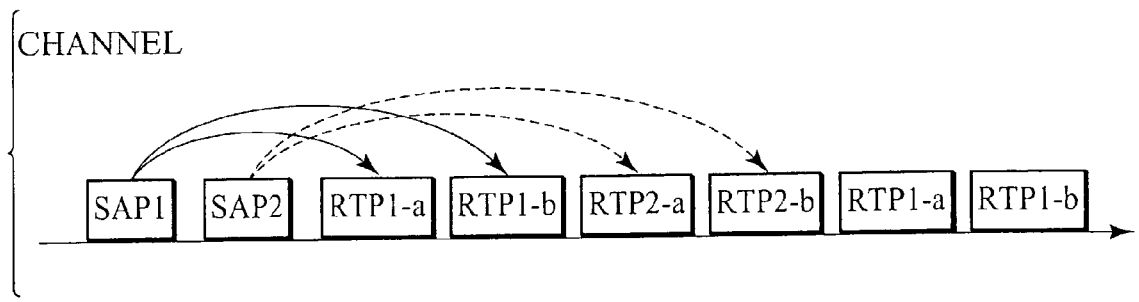
FIG. 45 is a diagram illustrating a state of transmitting a plurality of broadcast media in a broadcast communication system according to the related art.
FIG. 46 is a diagram showing SDP information in a SAP message for use in the broadcast communication system according to the related art.

Moreover, in the computer 4101, a program for executing the functions of the contents transmission server 10, the receiving terminal 20 and the relay apparatus 30, which are described in this specification, can be recorded in a computer-readable recording medium. The computer-readable recording medium, as shown in FIG. 44, are enumerated as, for example: the floppy disk 4102, the compact disk 4103, the IC chip 4104, the cassette tape 4105 and the like. Moreover, as well as the above-described computer 4101, a note-type PC, a mobile information terminal and the like are also included besides the desktop-type PC.

(The Effect of the Present Invention)

According to the present invention, since the receiving terminal 20 reproduces the broadcast media (audio information, video information and the like) based on the reproduction information indicating the reproduction method of the broadcast media (the SDP information in the SAP message and the description of SMIL transmitted in the data carousel system), any broadcast media can be quickly reproduced according to the reproduction method intended by the supplier of the broadcast media.

Moreover, according to the present invention, by transmitting the layout information as the reproduction information, the supplier of the broadcast media can freely change the display of the broadcast media on the display of the receiving terminal 20.

Moreover, according to the present invention, the supplier of the broadcast media becomes capable of performing the timing control regarding the reproduction of the broadcast media, for example, time synchronization processing between the video information and the text information.

Moreover, by using the reproduction information previously acquired (the reproduction information previously retained and the like), the receiving terminal 20 becomes capable of reproducing the broadcast media before receiving all the reproduction information (SMIL) via the wireless channels.

Moreover, according to the present invention, by use of the receiving terminal 20, the physical channel (wireless channel) for use in broadcast of the broadcast media and the IP address as the logical address can be associated with each other.

Moreover, according to the present invention, since the contents transmission server 10 transmits the reference information instead of the reproduction information, the reproduction method intended by the supplier of the broadcast media can be transmitted to the receiving terminal 20, and the amount of the transmitted data can be reduced.

Moreover, according to the present invention, via the broadcast notification information repeatedly transmitted (the SAP message or the H.245 message) and the reproduction information (or the reference information), even the receiving terminal 20 that starts to see and hear the broadcast of the broadcast media from the halfway thereof can quickly reproduce the broadcast media.

Moreover, according to the present invention, even if the information in the carousel data changes, the SAP message (or the H.245 message) never changes, thus enabling the transmission of the broadcast media to be continued.

Moreover, according to the present invention, the receiving terminal 20 can reproduce the first broadcast media (the RTP packet and the video information frame) received immediately after the broadcast notification information (the SAP message or the H.245 message) without referring to the other broadcast media (the video information frame). Thus, the receiving terminal 20 can immediately reproduce the first broadcast media without waiting for the other broadcast media to be received, after receiving the first broadcast media.

Moreover, according to the present invention, basically, the broadcast media subjected to the header compression processing (the broadcast media that needs to refer to the other broadcast media in order to be reproduced) is relayed to the receiving terminal 20. Thus, the overhead can be reduced.

Moreover, according to the present invention, at least one broadcast media, first received after receiving the broadcast notification information (the SAP message or the H.245 message), is made to be the broadcast media (the header compression refresh packet) reproducible without referring to the other broadcast media. Thus, even the receiving terminal 20 that starts to see and hear the broadcast of the broadcast media from the half way thereof can quickly reproduce the broadcast media.

Moreover, according to the present invention, the relay apparatus 30 converts the broadcast media (in which "TOC field" is set to "0xFF") associated with the identification information indicating that the broadcast media is first transmitted after transmitting the broadcast notification information (the SAP message or the H.245 message) into the broadcast media (the header compression refresh packet) which is reproducible without referring to the other broadcast media. Thus, even the receiving terminal 20 that starts to see and hear the broadcast of the broadcast media from the half way thereof can reproduce the broadcast media.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A server for delivering broadcast media including a plurality of transmission packets to a communication terminal, wherein the server is configured to:

transmit reproduction information indicating a reproduction method for the broadcast media designated by broadcast notification information prior to the reproduction of the broadcast media by the communication terminal;

transmit a transmission packet of the broadcast media to the communication terminal in a non-compression format configured to be reproduced without referring to another transmission packet of the broadcast media as a first transmission packet transmitted after transmitting the reproduction information, wherein the non-compression format configured to be reproduced without referring to another transmission packet of the broadcast media is a header compression refresh packet for initializing a header compression state; and transmit a transmission packet of the broadcast media to the communication terminal in a compression format configured to be reproduced only by referring to another transmission packet of the broadcast media when the transmission packet is not the first transmission packet transmitted after transmitting the reproduction information, wherein each of the transmission packets of the broadcast media transmitted from the server to the communication terminal is one of a Real-time Transport Protocol (RTP) packet, a User Data Protocol (UDP) packet and an Internet Protocol (IP) packet.

2. The server according to claim 1, wherein the server is configured to transmit, to a relay apparatus for relaying the broadcast media to the communication terminal, the transmission packet to be first transmitted after transmitting reproduction information of the broadcast media and identification information indicating an effect thereof in association with each other.

3. A computer readable storage medium, including computer executable instructions, which when executed by a computer cause the computer to implement a method of delivering broadcast media including a plurality of transmission packets to a communication terminal, the method comprising:

transmitting reproduction information indicating a reproduction method of the broadcast media designated by broadcast notification information prior to reproduction of the broadcast media by the communication terminal;

transmitting a transmission packet of the broadcast media to the communication terminal in a non-compression format configured to be reproduced without referring to another transmission packet of the broadcast media as a first transmission packet transmitted after transmitting the reproduction information, wherein of the non-compression format configured to be reproduced without referring to another transmission packet of the broadcast is a header compression refresh packet for initializing a header compression state; and transmitting a transmission packet of the broadcast media to the communication terminal in a compression format configured to be reproduced only by referring to another transmission packet of the broadcast media when the transmission packet is not the first transmission packet transmitted after transmitting the reproduction information, wherein each of the transmitted transmission packets of the broadcast media is one of a Real-time Transport Protocol (RTP) packet, a User Data Protocol (UDP) packet and an Internet Protocol (IP) packet.

4. The computer readable storage medium according to claim 3, wherein the method further comprises:

transmitting, to a relay apparatus for relaying the broadcast media to the communication terminal, the transmission packet first transmitted after transmitting the reproduction information of the broadcast media and identification information indicating an effect thereof in association with each other.

5. A method of delivering broadcast media including a plurality of transmission packets from a server to a communication terminal, the method comprising:

transmitting, by the server, reproduction information indicating a reproduction method of the broadcast media designated by broadcast notification information to the communication terminal;

transmitting, by the server, a transmission packet of the broadcast media to the communication terminal in a non-compression format configured to be reproduced without referring to another transmission packet of the broadcast media as a first transmission packet transmitted after transmitting the reproduction information, wherein of the non-compression format configured to be reproduced without referring to another transmission packet of the broadcast is a header compression refresh packet for initializing a header compression state; and transmitting, by the server, a transmission packet of the broadcast media to the communication terminal in a compression format configured to be reproduced only by referring to another transmission packet of the broadcast media when the transmission packet is not the first transmission packet transmitted after transmitting the reproduction information, wherein each of the transmitted transmission packets of the broadcast media is one of a Real- time Transport Protocol (RTP) packet, a User Data Protocol (UDP) packet and an Internet Protocol (IP) packet.

\* \* \* \* \*